United States Patent
Ranka et al.

(10) Patent No.: US 10,196,008 B2
(45) Date of Patent: Feb. 5, 2019

(54) CARGO MANAGEMENT SYSTEM FOR MOTOR VEHICLE

(71) Applicant: JAC Products, Inc., Saline, MI (US)

(72) Inventors: Noel V. Ranka, Canton, MI (US);
Gerard J. Kmita, Allen Park, MI (US);
Gerald J. Gomes, Macomb, MI (US);
Brandon T. McMahan, Pontiac, MI (US); Conde M. Gonzalez, Utica, MI (US)

(73) Assignee: JAC Products, Inc., Saline, MI (US)

( * ) Notice: Subject to any disclaimer, the term of this patent is extended or adjusted under 35 U.S.C. 154(b) by 126 days.

(21) Appl. No.: 15/228,609

(22) Filed: Aug. 4, 2016

(65) Prior Publication Data

US 2017/0050579 A1 Feb. 23, 2017

Related U.S. Application Data

(60) Provisional application No. 62/305,827, filed on Mar. 9, 2016, provisional application No. 62/201,419, filed on Aug. 5, 2015.

(51) Int. Cl.
*B60P 7/14* (2006.01)
*B60R 11/06* (2006.01)
*B60R 13/01* (2006.01)

(52) U.S. Cl.
CPC ............ *B60R 11/06* (2013.01); *B60P 7/14* (2013.01); *B60R 13/013* (2013.01)

(58) Field of Classification Search
CPC ........... B60R 11/06; B60R 13/013; B60P 7/14

USPC ........................................................ 296/37.5
See application file for complete search history.

(56) References Cited

U.S. PATENT DOCUMENTS

| | | | | |
|---|---|---|---|---|
| 2,020,514 A | * | 11/1935 | Moffitt ................... | A47B 65/00 206/449 |
| 4,226,348 A | | 10/1980 | Dottor et al. | |
| 4,538,737 A | * | 9/1985 | Delaney ................ | B60P 7/0892 206/560 |
| 4,540,213 A | * | 9/1985 | Herlitz ..................... | B60R 7/02 211/195 |
| 4,718,584 A | * | 1/1988 | Schoeny ................... | B60R 7/02 217/12 R |

(Continued)

FOREIGN PATENT DOCUMENTS

| DE | 4015556 A1 | 11/1990 |
|---|---|---|
| DE | 4234812 A1 | 4/1994 |

(Continued)

*Primary Examiner* — Pinel E Romain
(74) *Attorney, Agent, or Firm* — Harness, Dickey & Pierce, P.L.C.

(57) ABSTRACT

A cargo management system for use with a motor vehicle cargo area having a floor. The system uses front, center are rear divider panels each configured to lay flat adjacent the floor when in a stowed position, and each is pivotally moveably into an upright, operative position. A first latching mechanism is used to releasably latch the front divider in the upright, operative position. The center divider panel is pivotally moveable from a stowed position to an operative position. The rear divider panel is pivotally moveable from a stowed position resting generally flat on the floor of the cargo area to an upright, operative position. A second latching mechanism is used to releasably hold the rear divider panel in the upright, operative position.

20 Claims, 24 Drawing Sheets

(56) References Cited

U.S. PATENT DOCUMENTS

| | | | |
|---|---|---|---|
| 5,161,700 A * | 11/1992 | Stannis | B60R 7/02 211/175 |
| 5,392,972 A | 2/1995 | Caruso et al. | |
| 5,484,091 A * | 1/1996 | Malinowski | B60R 7/02 224/42.33 |
| 5,501,384 A * | 3/1996 | Wisniewski | B60R 7/02 220/531 |
| 5,538,148 A * | 7/1996 | Indyk | B60P 7/135 211/12 |
| 5,713,502 A * | 2/1998 | Dixon | B60R 7/02 190/103 |
| 6,015,071 A | 1/2000 | Adomeit et al. | |
| 6,106,050 A * | 8/2000 | McLeod | B62D 33/0273 296/100.06 |
| 6,138,883 A * | 10/2000 | Jackson | B60R 9/00 224/404 |
| 6,296,289 B1 | 10/2001 | Gehring et al. | |
| D450,291 S * | 11/2001 | Wang | D12/426 |
| 6,422,567 B1 * | 7/2002 | Mastrangelo | B60R 5/04 224/281 |
| 6,488,168 B1 | 12/2002 | Wang | |
| 6,609,744 B2 | 8/2003 | Gehring et al. | |
| 6,974,170 B2 * | 12/2005 | Mulvihill | B60P 7/0892 224/42.33 |
| 7,201,421 B2 | 4/2007 | Reynolds et al. | |
| 7,959,390 B2 * | 6/2011 | Gorski | B60R 7/02 410/121 |
| 8,215,693 B2 | 7/2012 | Ulita | |
| 8,991,894 B2 | 3/2015 | Smith et al. | |
| 9,381,865 B2 | 7/2016 | Kmita et al. | |
| 9,821,701 B2 * | 11/2017 | Kanczuzewski | F16M 13/022 |
| 2002/0000456 A1 | 1/2002 | Zimmermann et al. | |
| 2004/0160083 A1 * | 8/2004 | Marx | B60J 7/041 296/100.09 |
| 2009/0212584 A1 | 8/2009 | Hill | |

FOREIGN PATENT DOCUMENTS

| | | |
|---|---|---|
| DE | 4432369 A1 | 3/1996 |
| DE | 10110335 A1 | 9/2002 |
| DE | 102006052785 A1 | 5/2008 |
| DE | 102008061108 A1 | 6/2010 |
| EP | 1321335 A1 | 6/2003 |
| FR | 2752790 A1 | 3/1998 |
| GB | 2466202 A | 6/2010 |
| JP | 2003025922 A | 1/2003 |

* cited by examiner

Section D - D

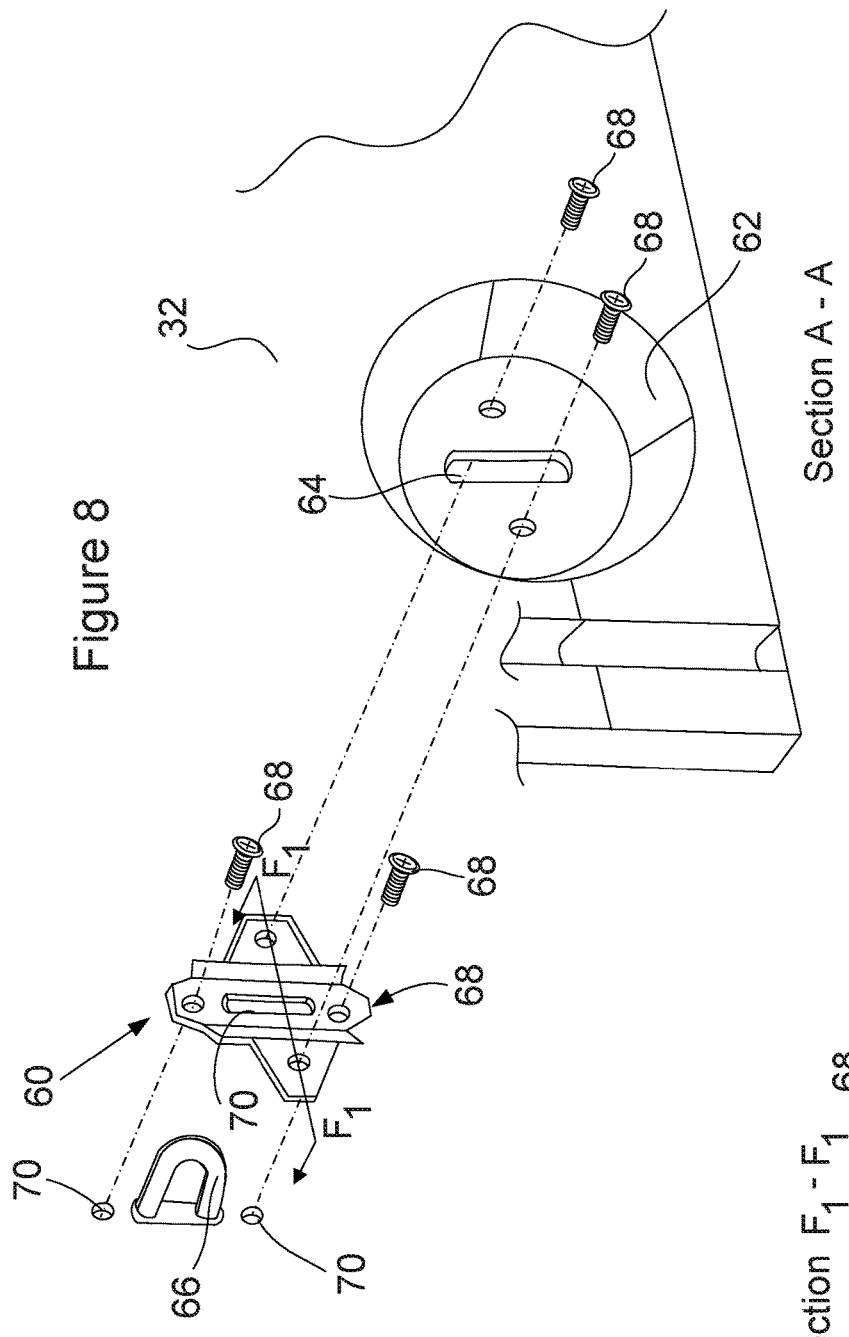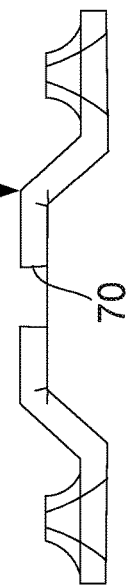

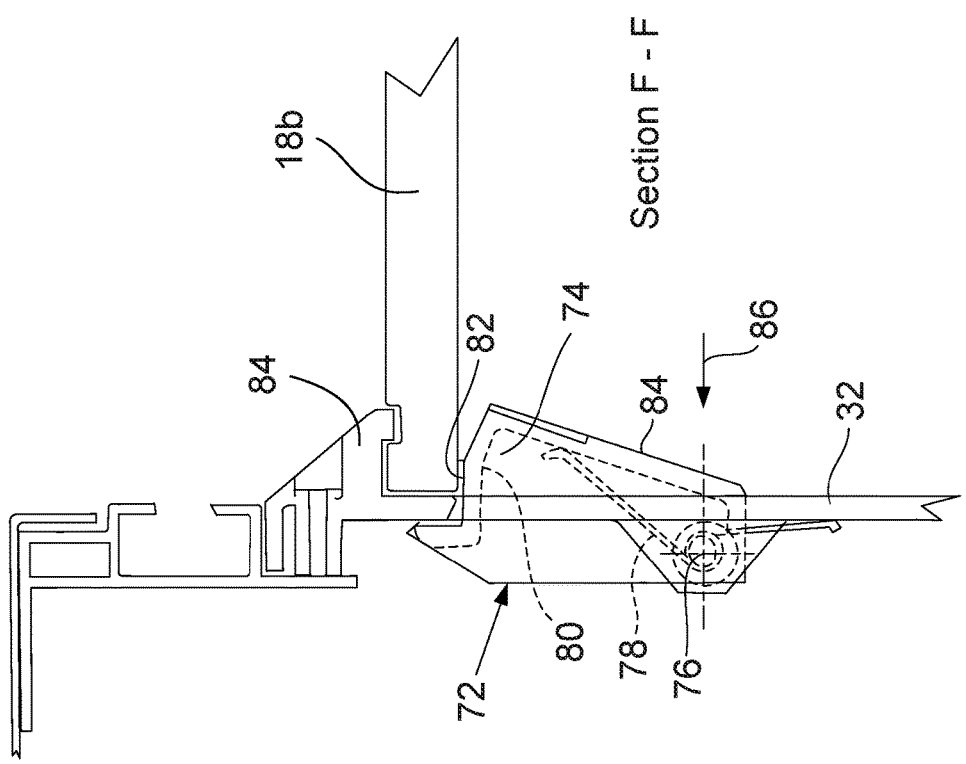

CARGO MANAGEMENT SYSTEM FOR MOTOR VEHICLE

CROSS-REFERENCE TO RELATED APPLICATIONS

This application claims the benefit of U.S. Provisional Application No. 62/305,827, filed on Mar. 9, 2016, and U.S. Provisional Application No. 62/201,419, filed on Aug. 5, 2015. The entire disclosures of each of the above applications are incorporated herein by reference.

FIELD

The present disclosure relates to cargo management systems and more particularly to a cargo management system that employs a plurality of articulating panels that may be folded flat on a floor of a cargo area of a motor vehicle when not needed, and quickly and easily articulated into an operative configuration to form a plurality of partitions that help to restrain cargo items from moving around in the cargo area when the vehicle is moving.

BACKGROUND

The statements in this section merely provide background information related to the present disclosure and may not constitute prior art.

Vehicles such as SUVs, minivans and especially pickup trucks have grown in popularity in recent years. Many individuals use these vehicles for daily transportation purposes, which often involve shopping trips where various types of smaller cargo items, for example groceries, need to be transported. Especially with smaller cargo items, sometimes there is a tendency for such items to move around in the cargo area of the vehicle when the vehicle is moving. This is especially so with pickup trucks, which typically have a large, open truck bed area. It would be especially helpful to have some form of cargo management system that could be quickly and easily deployed by the vehicle operator without the need for any tools, and which sections that prevent cargo items from moving around when the vehicle is in motion. It would also be highly desirable if such a cargo management system could be quickly articulated into a stowed configuration, without requiring the use of any external tools, so that the system consumes minimal space in the vehicle's cargo area when it is not needed for use.

SUMMARY

In one aspect the present disclosure relates to a cargo management system for use with a motor vehicle cargo area with a floor. The system may include front, center and rear divider panels. The front divider panel is configured to lay flat against the floor of the cargo area when in a stowed position, and is pivotally moveably into an upright, operative position. A first latching mechanism is included for latching the front divider panel to at least one of a pair of opposing sidewalls of the cargo area. The center divider panel is pivotally supported so as to be moveable from a stowed position to an operative position. The rear divider panel is pivotally supported relative to the floor of the cargo area and moveable from a stowed position resting generally flat on the floor of the cargo area to an upright, operative position. A second latching mechanism is incorporated for latching the rear divider panel in the upright, operative position.

In another aspect the present disclosure relates to a cargo management system for use with a motor vehicle cargo area with a floor. The system may include front, rear and center divider panels. The front divider panel is configured to lay flat against the floor of the cargo area when in a stowed position, and is pivotally moveably into an upright, operative position. A first latching mechanism is configured to releasably latch opposing side portions of the front divider panel to opposing sidewalls of the cargo area, to thus maintain the front divider panel in the upright, operative position. The center divider panel is pivotally supported so as to be moveable from a stowed position to an upright, operative position. The rear divider panel is pivotally supported relative to the floor of the cargo area and moveable from a stowed position resting generally flat on the floor of the cargo area to an upright, operative position. An auxiliary panel is also incorporated which is hingedly coupled to the rear divider panel. A second latching mechanism is disposed in the sidewalls and is operable to engage with the opposing sides of the rear divider panel to hold the rear divider panel in the upright, operative position. A third latching mechanism is configured to releasably latch the auxiliary panel to the bed sidewalls in a horizontal orientation extending parallel to the floor.

In still another aspect the present disclosure relates to a cargo management system for use with a motor vehicle cargo area with a floor. The system may include front, center and rear divider panels. The front divider panel is configured to span fully between a pair of sidewalls of the cargo area and to lay flat against the floor of the cargo area when in a stowed position, and is further pivotally moveably into an upright, operative position. A first latching mechanism is included which is associated with the front divider panel. A pair of first formed recesses is disposed in the pair of sidewalls of the vehicle cargo area and configured to cooperate with the first latching mechanism to hold the front divider panel the upright, operative position. The center divider panel is pivotally supported from the floor so as to be moveable from a stowed position to an upright, operative position extending parallel to the sidewalls. A locking system is carried on the center divider panel. The locking system is operable to engage with an opening in the front divider panel to hold the center divider panel in the upright, operative position. The rear divider panel is configured to fully span between the sidewalls and is pivotally supported relative to the floor of the cargo area, and moveable from a stowed position resting generally flat on the floor of the cargo area to an upright, operative position. A second latching system is formed by a pair of latch assemblies disposed on the sidewalls. The pair of latch assemblies is operable to engage with the rear divider panel to hold the rear divider panel in the upright, operative position. An auxiliary panel is also included which is hingedly coupled to the rear divider panel. A third latching mechanism is operably associated with the auxiliary panel. A pair of second formed recesses is also disposed on the sidewalls and is operable to cooperate with the third latching mechanism to releasably latch the auxiliary panel in a horizontal orientation extending parallel to the floor.

BRIEF DESCRIPTION OF THE DRAWINGS

The drawings described herein are for illustration purposes only and are not intended to limit the scope of the present disclosure in any way.

FIG. 8 is a perspective view of a tie down bracket assembly that may optionally be included with the system to form a tie down point where external bungee cords or other straps may be used to help secure cargo items;

FIG. 9 is a side view of a bracket element of the assembly of FIG. 8; and

FIG. 10 is a side view of a latching assembly which may be used to latch one of the panel sections of the system into a horizontal position adjacent the tailgate of the vehicle, and thus form an enclosed compartment behind the tailgate.

DETAILED DESCRIPTION

Figure 1:
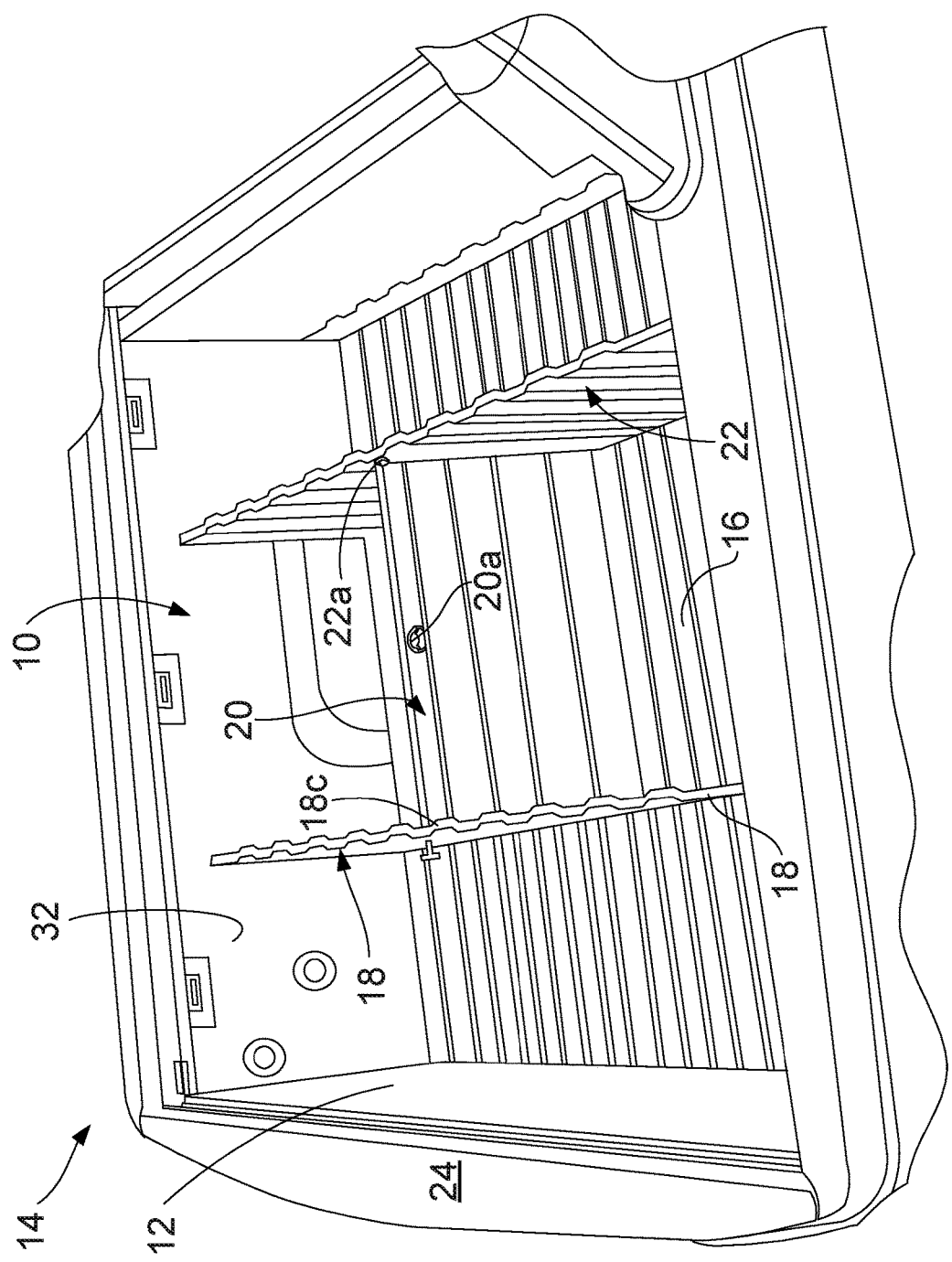
FIG. 1 is a high level perspective view of a cargo management and restraining system in accordance with one embodiment of the present disclosure incorporated into the bed of a pickup truck, with the various panels of the system raised into their operative positions to form a plurality of partitions forming box-like cargo restraining sections within the truck bed.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a cargo management system 10 employed in a bed 12 of a vehicle 14. The vehicle 14 is a pickup truck in this example, but the system 10 is not limited to use with only pickup trucks. The system 10 may be implemented in the cargo area of virtually any type of vehicle having a relatively open floor, such as possibly an SUV, a minivan, a full size van, or possibly even an open or closed trailer.

Figure 2:
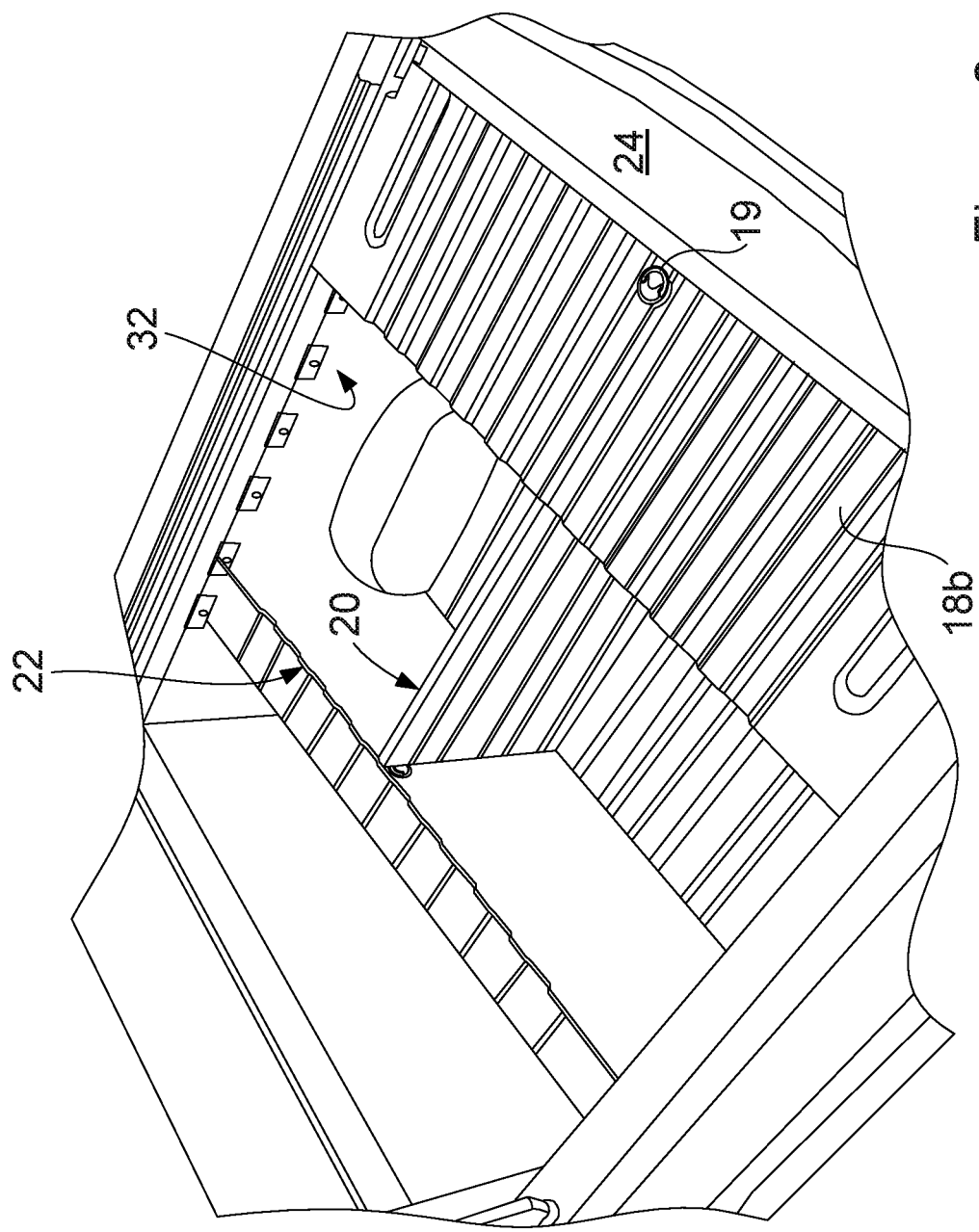
FIG. 2 shows the system of FIG. 1 with a second rear vertical panel portion raised into an operative position to form an enclosure adjacent the tailgate of the vehicle.

The system 10 includes a bed floor 16 to which is attached a plurality of panels that may each be articulated between stowed and operative positions. The panels include a rear vertical panel 18, a middle panel 20 and a front vertical panel 22. The rear vertical panel 18 includes first panel portion 18a, which is visible in FIG. 1, and a second panel portion 18b which is visible in FIG. 2. In FIG. 1 the second panel portion 18b is in its inoperative position and is not readily visible, while in FIG. 2 it is in its operative position, extending horizontally, and forming an enclosure with the assistance of a tailgate 24 of the vehicle 14. A pivoting pull ring 19 may be associated with second panel portion 18b to enable the user to articulate it into its vertical and horizontal orientations.

Each of the panels 18, 20, and 22 may be hingedly secured to the bed floor 16, which itself is a corrugated like, high strength component that may be made from a suitably high strength plastic or other lightweight, durable material. Each of the panels 18, 20 and 22 may likewise be made from a lightweight, high strength material such as plastic. Each panel 18, 20 and 22 may include a pivotally mounted pull ring 18c, 20a and 22a that sits in a recess when its associated panel is lying flat on the bed floor 16, and therefore does not impede sliding cargo items over the bed floor 16. The pull rings 18c, 20a and 22a, however, are easy for an individual to grasp and enable an individual to lift a panel from its stowed orientation into an operative operation using just one hand. When the panels 18, 20 and 22 are in their operative (i.e., upright) positions, they form a plurality of partitions which form box-like sections where cargo items of various shapes and sizes may be placed. The box-like sections prevent cargo items from rolling or sliding around within the truck bed 12 while the vehicle 14 is moving. The box-like sections may also help to hold packages upright in a desired orientation, which is important when transporting groceries packed in grocery bags. Advantageously, the system 10 forms box-like sections adjacent the rear vertical panel 18 and the front vertical panel 22 which are different in shape than the box-like sections formed on opposing sides of the middle panel 20. This maximizes the ability of the system 10 to receive differently sized and shaped cargo items when the panels 18-20 are all raised into their operative positions.

Figure 3:
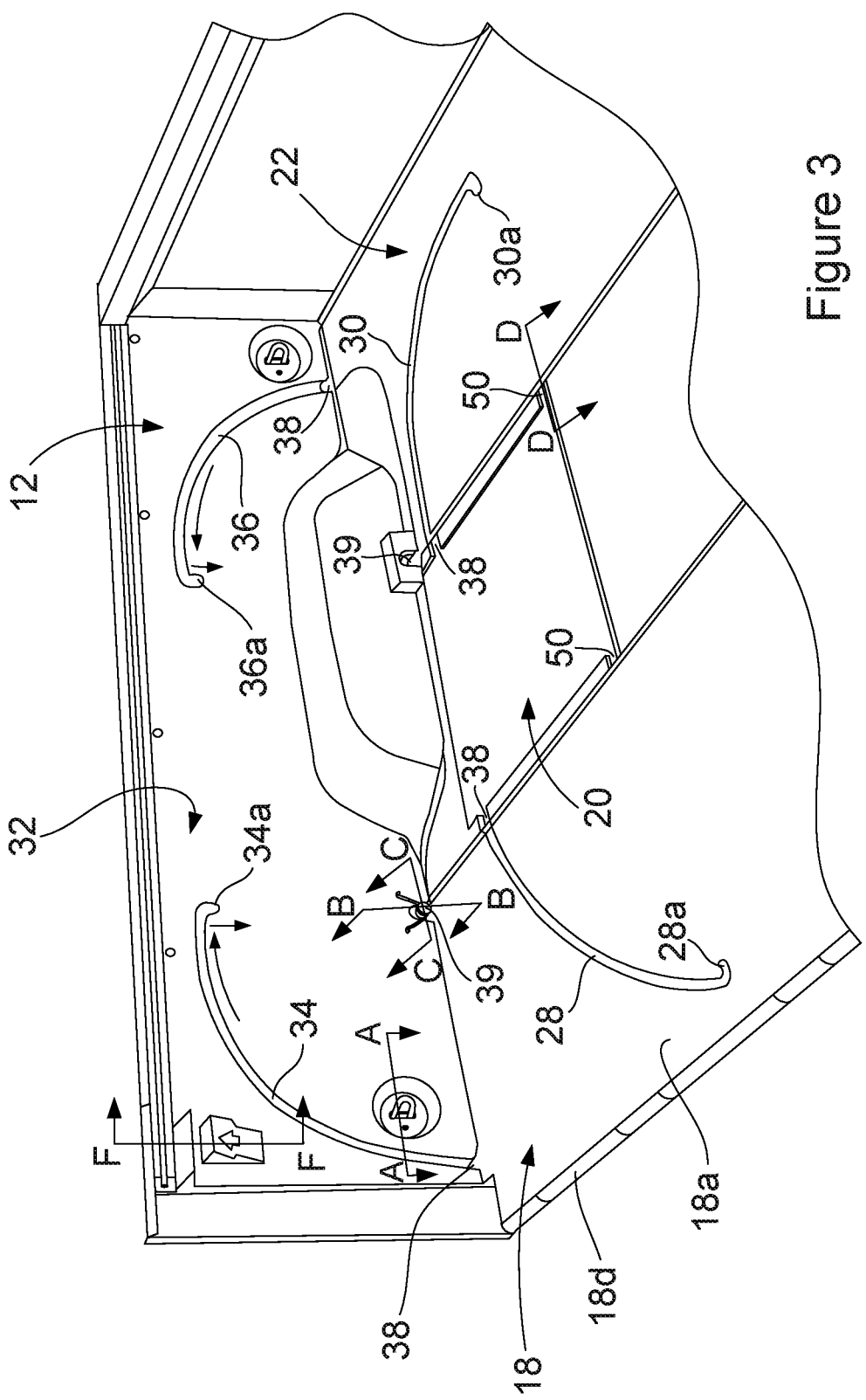
FIG. 3 is a high level perspective view of the system with the various panels shown in their stowed orientations, and the tailgate in an open position.

Referring to FIG. 3, the system 10 is shown in its stowed configuration. The rear vertical panel 18 includes an arcuate channel 28, and the front vertical panel 22 likewise includes a similar arcuate channel 30. The system 10 may further include sidewall panels 32, only one of which is visible in FIG. 3, which are secured to the insides of the sidewalls of the truck bed 12. The sidewall panel 32 shown in FIG. 3 includes a pair of arcuate channels 34 and 36. Channel 34 has a downward leg 34a and channel 36 similarly has a downward leg 36a. Likewise, channel 28 as a downward leg 28a and channel 30 has a downward leg 30a. Arcuate channels 28, 30, 34 and 36 may also be understood to have a curvature that provides a slight camming action. This feature will be discussed further in the following paragraphs.

With further reference to FIG. 3, the rear vertical panel section 18a, the middle panel 20 and the front vertical panel 22 each include a pin assembly 38 for securing its associated panel in the operative (i.e., upright) orientation. In this example the middle panel 20 includes a pair of the pin assemblies 38. Pin assembly 38 of the rear vertical panel 18 rides in the arcuate slot 34 when the rear vertical panel 18 is lifted and lowered. Pin assembly 38 of the front vertical panel rides in the arcuate slot 36 as the panel 36 is raised and lowered, and the pin assemblies 38 of the middle panel 20 ride in the arcuate slots 28 and 30 as the middle panel 20 is raised and lowered. The arcuate slots 28, 30, 36 and 34 have a curvature that effects a slight camming action as its respective panel is moved into an upright orientation. This camming action provides a slight over center locking action just as the pin assembly 38 enters the downward leg 34a of the arcuate channel 34. For example, when the rear vertical panel 18 is raised into a vertical orientation, its pin assembly 38 will ride in the arcuate channel 34 and as the pin assembly 38 reaches the uppermost area of the channel near the downward leg 34a, it will require a slightly higher degree of force to continue moving the pin assembly 38 toward the downward leg 34a. But as the pin assembly 38 reaches the very top of the arcuate channel 34, the pin assembly will tend to snap into the downward leg 34a with the over center-like locking action mentioned above. This ensures that the rear vertical panel 18 will remain in its vertical position and not simply fall over.

When panel 18 needs to be moved from its vertical (operative) position to its stowed position, the user may exert a slight pushing force at an upper edge 18d of the panel 18 to overcome the over center locking action and urge the pin assembly back into the arcuate portion of the arcuate channel 34. The front vertical panel 22 operates in the same way as it is moved into its vertical position. Likewise, the same locking action occurs when the middle panel 20 is moved into its vertical position after both the rear and front vertical panels 18 and 22 have been placed in their vertical positions. When the rear vertical panel 18 is folded down flat in its stowed orientation as shown in FIG. 3, the second panel portion 18b rests underneath the first panel portion 18a and flat against the surface (i.e., the hidden surface in FIG. 3) of the first panel portion 18a, on the bed floor 16.

Figure 4:
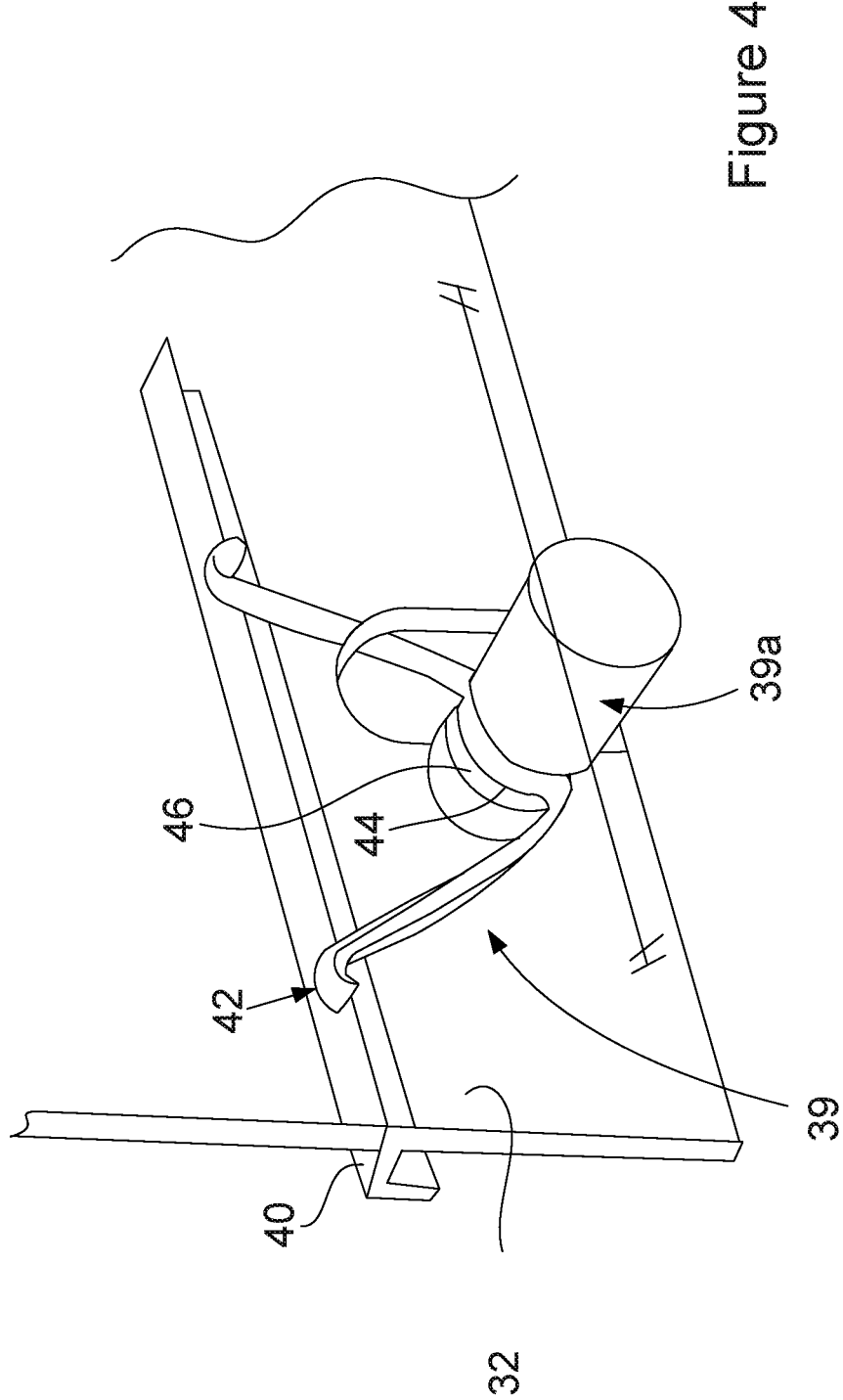
FIG. 4 is an perspective view of a portion of a pivot pin assembly which is used to help provide pivoting motion to various ones of the panel sections of the system.
Figure 5:
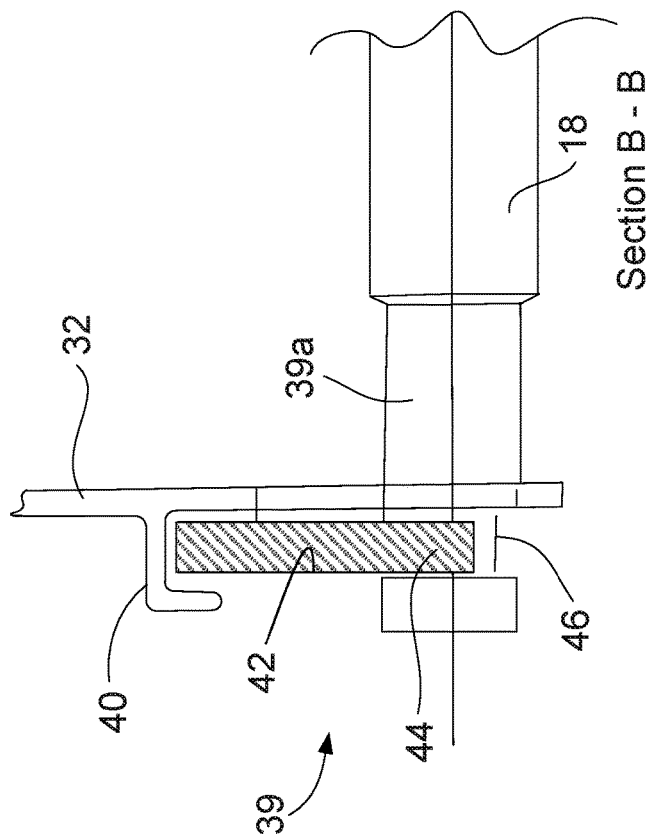
FIG. 5 is a high level cross sectional side view of the pivot pin assembly shown in FIG. 3 taken in accordance with section line B-B in FIG. 2.

With brief reference to FIGS. 3, 4 and 5, a portion of a pivot pin assembly 39, which is used with both of the rear and front vertical panels 18 and 22, is shown. Separate pivot pin assemblies 39 are disposed at the opposing sides of each of the rear and front vertical panels 18 and 22 and allow pivoting motion of the panels 18 and 22 without the panels becoming detached from the sidewall panels 32. FIGS. 4 and 5, in particular, show the structure associated with the pivot pin assembly 39 and how this structure is integrated with its respective sidewall panel 32. It will be appreciated that this structure is incorporated wherever pivot pin assembly 39 is used.

Figure 6:
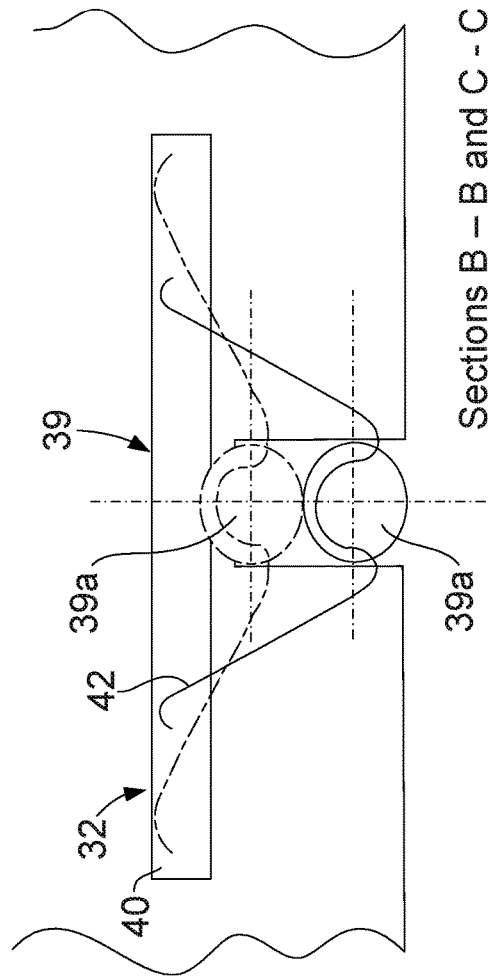
FIG. 6 is a high level cross sectional end view of the pivot pin assembly shown in FIG. 4 and showing a pivot pin of the assembly in its different positions as it is moved between its operative and stowed positions, and while it is in its operative and stowed positions.

FIGS. 4, 5 and 6 show that the sidewall panel 32 may incorporate an inwardly projecting ledge 40 on a back (i.e., hidden) side of the sidewall panel 32. A spring 42 in the shape of a leaf spring, and having an arcuate section 44, may be positioned to abut a pin 39a of the pivot pin assembly 39 and ride in a groove 46 at the end of the pivot pin 39a. The sidewall panel 32 may also have a slot 48 that permits a small degree of vertical movement of the pivot pin 39a when the rear vertical panel 18 is being moved between its vertical and stowed positions, and thus helps to provide the slight camming action "feel" described above when the pin assembly 38 of the rear vertical panel 18 snaps into the downward leg 34a of the arcuate channel 34. The spring 42 allows rotation of the pivot pin 39a but exerts a constant downward force on the pivot pin 39a when the rear vertical panel 18 is being moved between its vertical position and its stowed position, and helps to hold the pivot pin 39a in a downward position when the rear vertical panel 18 is in its operative (vertical) or stowed (horizontal) orientations. In effect the spring 42 exerts a slightly greater downward force as the rear vertical panel 18 is moving between its stowed and operative positions, and helps to provide the over center action camming action described above when the pin assembly 38 snaps into the downward leg 34a of the arcuate slot 34.

Figure 7:
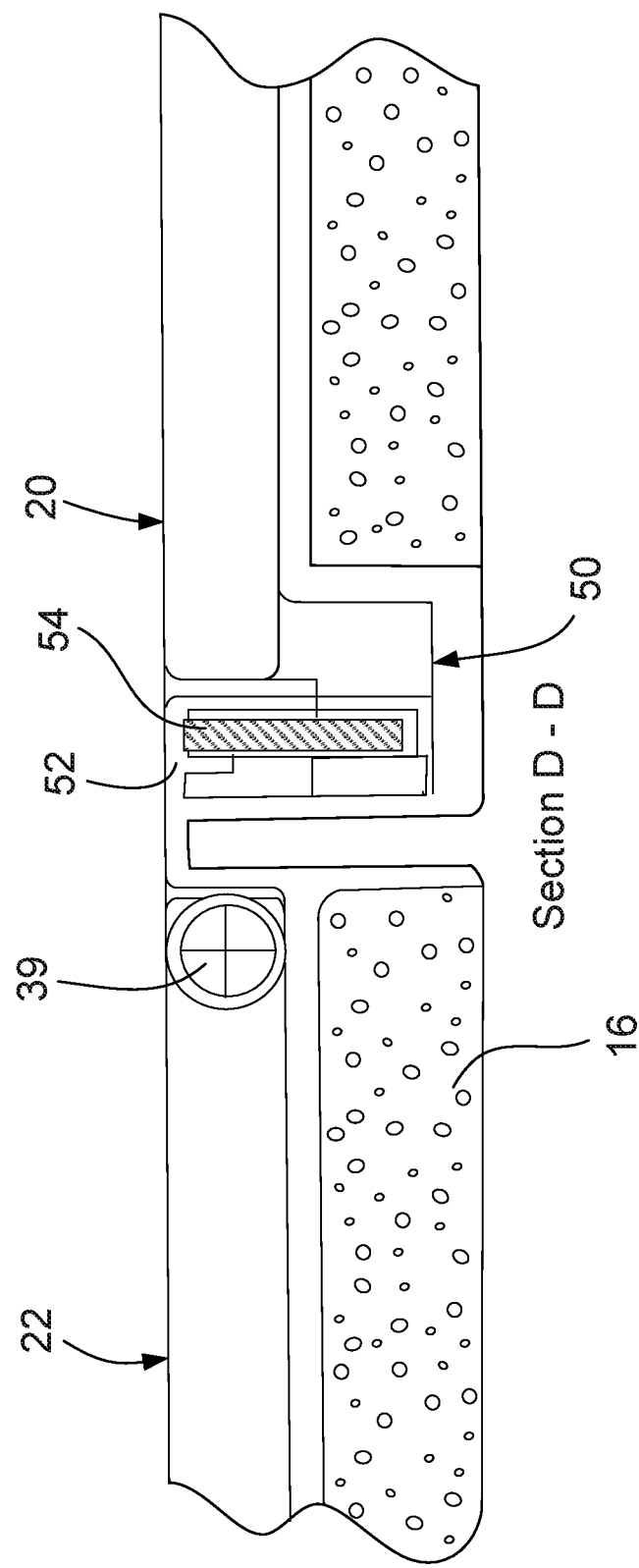
FIG. 7 is a side view of an assembly used to provide pivoting movement for the middle panel of the system.

FIGS. 3 and 7 also show pivot pins 50 which are formed at opposing side edges of the middle panel 20 and which enable the middle panel to be pivoted from its stowed position into its operative (vertical) position and vice versa. In this example each pivot pin 50 forms an L-shape, as shown in FIG. 7. The bed floor 16 may include a channel 52 or track for capturing a spring 54 in the shape of a leaf spring, like the springs 42 shown in FIGS. 4-6. The spring 54 engages a groove 56 in the pivot pin 50 and operates in a manner similar to that explained for pivot pin assembly 39 as the middle panel 20 is moved between its stowed and operative positions.

FIG. 8 shows one example of a tie down bracket assembly 60 that may be secured to the bed sidewall panel 32. The bed sidewall panel 32 may have a recess 62 with an opening 64 formed therein. The opening 64 may receive a tie down loop component 66 which extends through an opening 70 in a bracket element 68, which both may then be secured using threaded fasteners 68 and nuts 70. The bracket element 68 is shown from a side view in FIG. 9.

FIGS. 3 and 10 also show a support assembly 72 for supporting the second vertical panel section 18b in a horizontal position and thus forming a secure, enclosed area immediately behind the tailgate 24. Referring specifically to FIG. 10, a latch element 74 is pivotally mounted on a pivot pin 76 and biased into the position shown in FIG. 10 by a torsion spring 78. Opposite ends of the torsion spring 78 are in contact with a rear pocket 80 of the latch element 74 and a rear surface of the sidewall panel 32. The latch element 74 includes a flat portion 82 which engages a lower surface of the second vertical panel section 18b as the panel section 18b is moved upwardly in a pivoting motion into a horizontal position. The latch element 74 cooperates with a ledge 84 of the sidewall panel 32 to capture the edge of the second vertical panel section 18b therein. In this position, when the tailgate 24 is up and locked, the second vertical panel section 18b cannot be lifted upwardly or pushed downwardly. Thus, the support assembly 72 functions as a locking element to prevent access to the interior area formed by the panel sections 18a, 18b and the tailgate 24. Once the tailgate 24 is unlocked and opened, the user may simply press inwardly along wall portion 84, in accordance with arrow 86, to allow the panel section 18b to be lowered. It will be appreciated that the support assembly 74 is located on both sidewall panels 32, and therefore the user will be required to simultaneously press inwardly on both latch elements 74 to fully release the panel section 18b and allow lowering thereof.

In operation, to deploy the system 10 into its useable configuration from its stowed configuration, the user may first raise the rear vertical panel 18 into its vertical position until it associated pin assemblies 38 lock into the downward legs 34a of the arcuate channels 34 at the opposite sides thereof. The user may then raise the front vertical panel 22 into a vertical position until its associated pin assemblies 38 engage in the downward legs 36a of the arcuate channels 36 at the opposite sides thereof. The user may then raise the middle panel 20 until the pin assemblies 38 engage in the downward legs 28a and 30a of the arcuate tracks 28 and 30, respectively. Optionally the second panel portion 18b may be lifted into a horizontal position unit it engages with the latching elements 74 on the bed sidewalls 32. Moving the panels 18-22 into their stowed positions may be accomplished by performing the above described operations in the reverse order.

Figure 11:
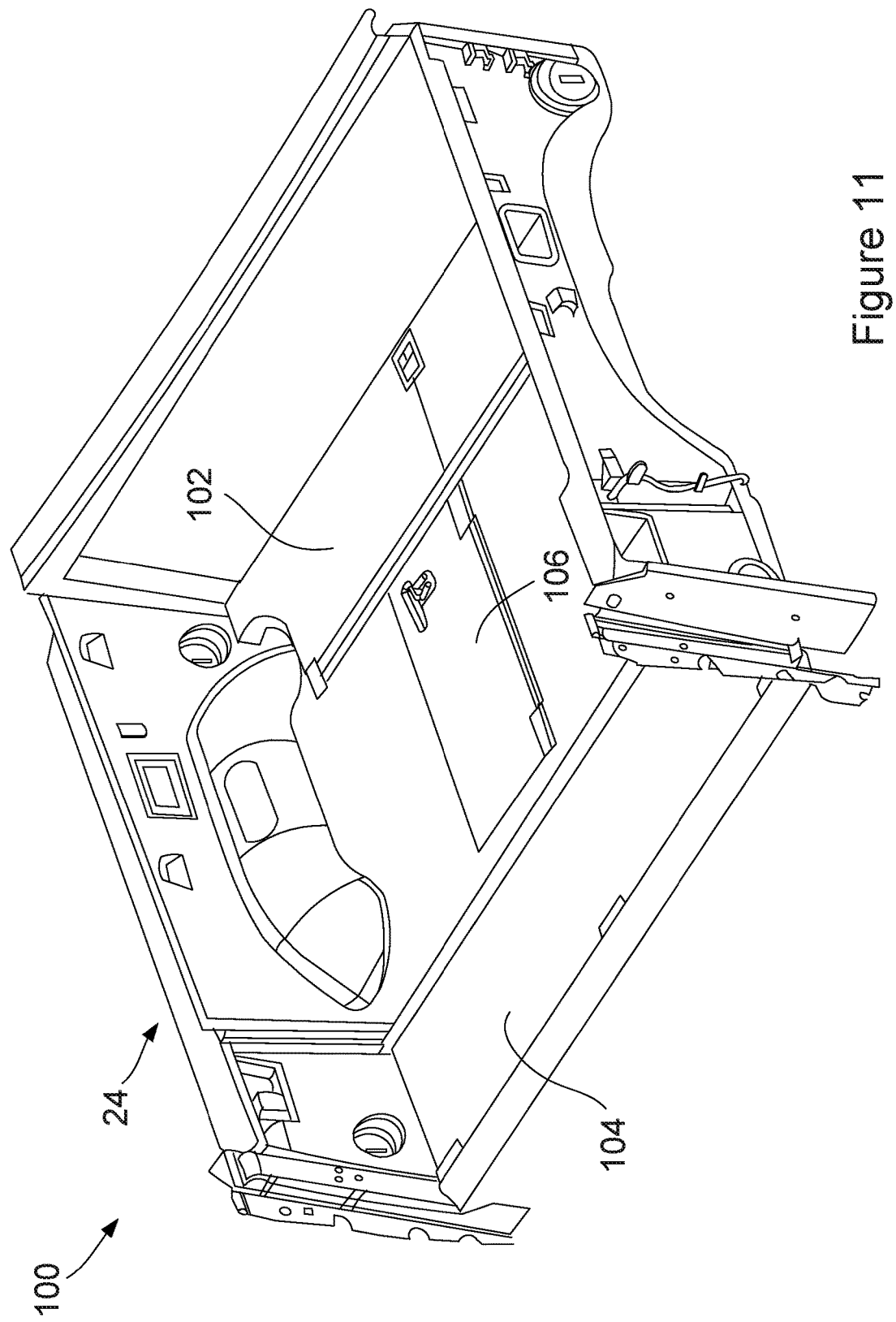
FIG. 11 is a perspective view of another embodiment of the cargo management system of the present disclosure showing the system with a plurality of divider panels in their stowed orientations.

Referring now to FIG. 11, a cargo management system 100 in accordance with another embodiment of the present disclosure is shown disposed in the bed 12 of the vehicle 14. The vehicle 14 in this example is again a pickup truck, although it will be appreciated that the system 100 could just as readily be implemented in a cargo area of an SUV, a cargo area of a minivan, a cargo area of a full size van, or even within a trailer adapted to be pulled behind a vehicle, etc. As such, the system 100 should not be considered as being limited to use with only one specific type of motor vehicle or trailer-like implement.

Figure 12:
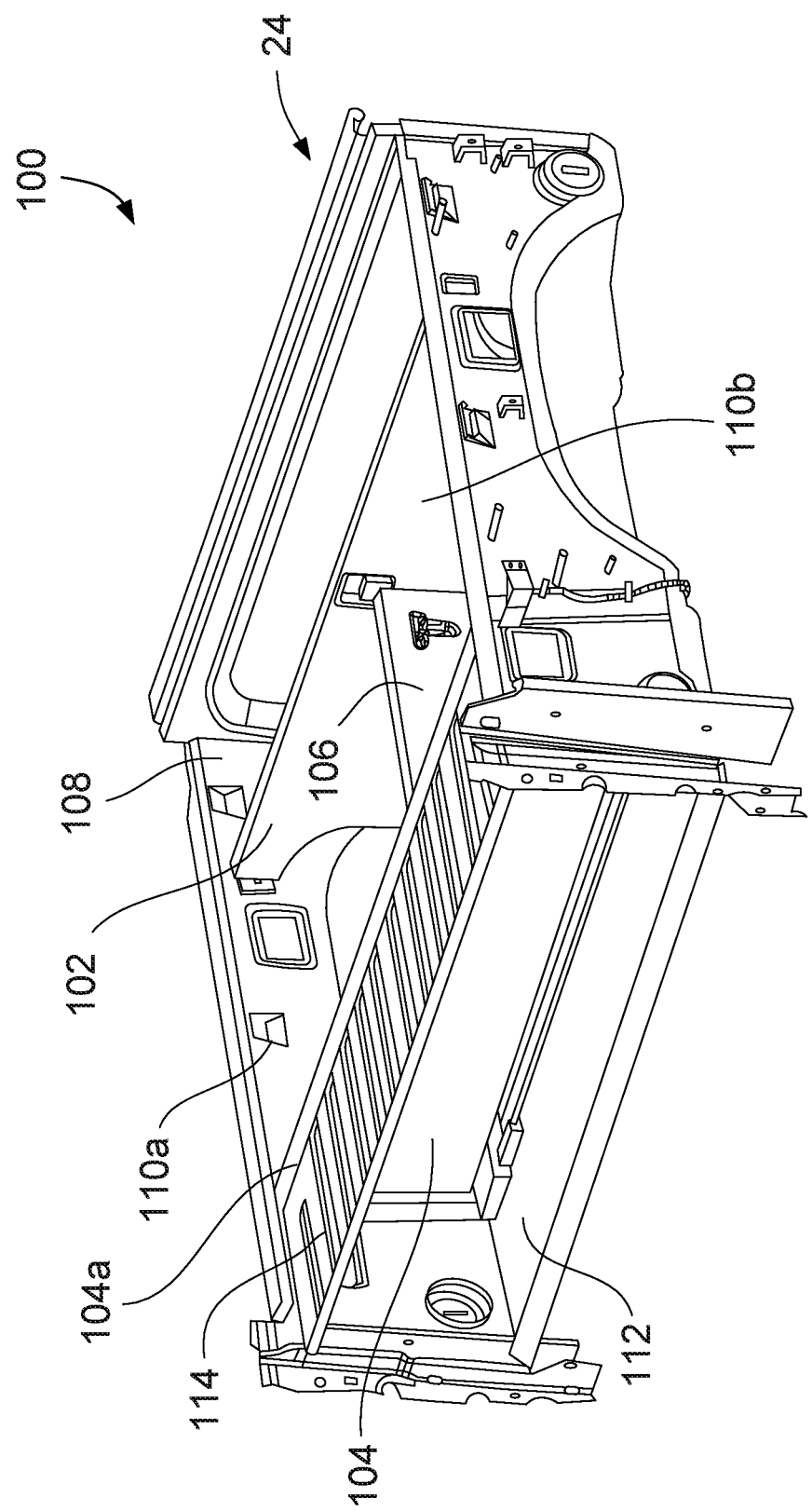
FIG. 12 is a perspective view of the system of claim 11 with off of the divider panels in their deployed or operative (i.e., upright) positions, with the tailgate of the vehicle bed having been omitted for clarity.

The system 100 in FIG. 11 is shown in its fully collapsed configuration, which enables substantially the entire bed 12 to form one large compartment to better hold larger cargo items. The system 100 takes up substantially no room within the bed 12 when the system is in its collapsed configuration. The system 100 includes a front divider panel 102, a rear divider panel 104 and a center divider panel 106. FIG. 12 shows the front, rear and center divider panels 102, 104 and 106, respectively, in their operative positions. In their operative positions, the divider panels 102,104,106 form a front compartment 108, a pair of central compartments 110a and 100b, and a rear compartment 112. The rear compartment 112 is formed in part by a rear auxiliary panel 114 which is hingedly supported from an upper edge 104a of the rear divider panel 104. Auxiliary panel 114 can also be left in its lowered position when the rear divider panel 104 is positioned in its operative (i.e., upright) configuration, which would leave the interior of the rear compartment 112 open for access when the tailgate 24 of the vehicle 14 is in its raised (i.e., closed) position.

Figure 13:
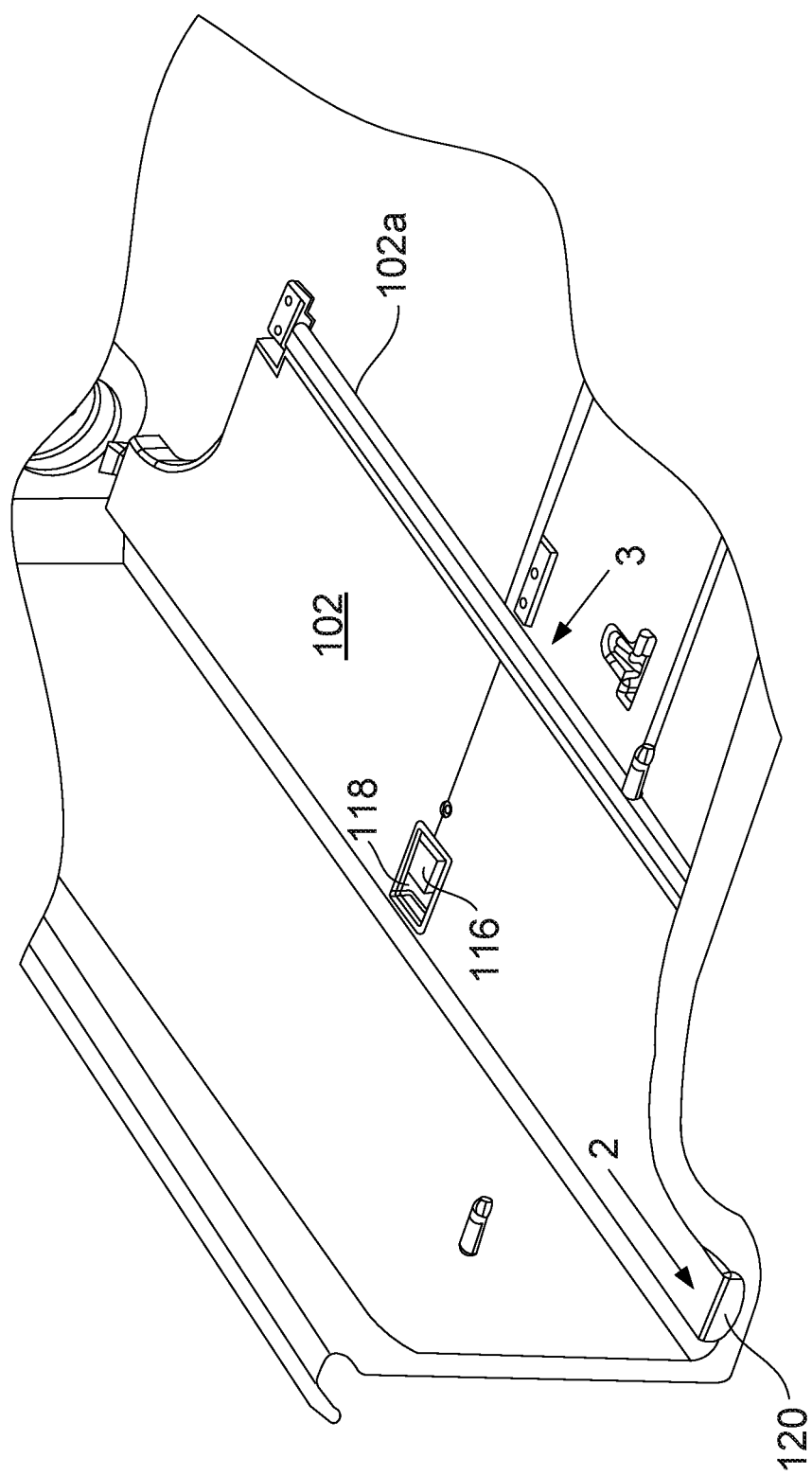
FIG. 13 is a perspective view of the front divider panel being held in its stowed (i.e., lowered) orientation with the bed.
Figure 14:
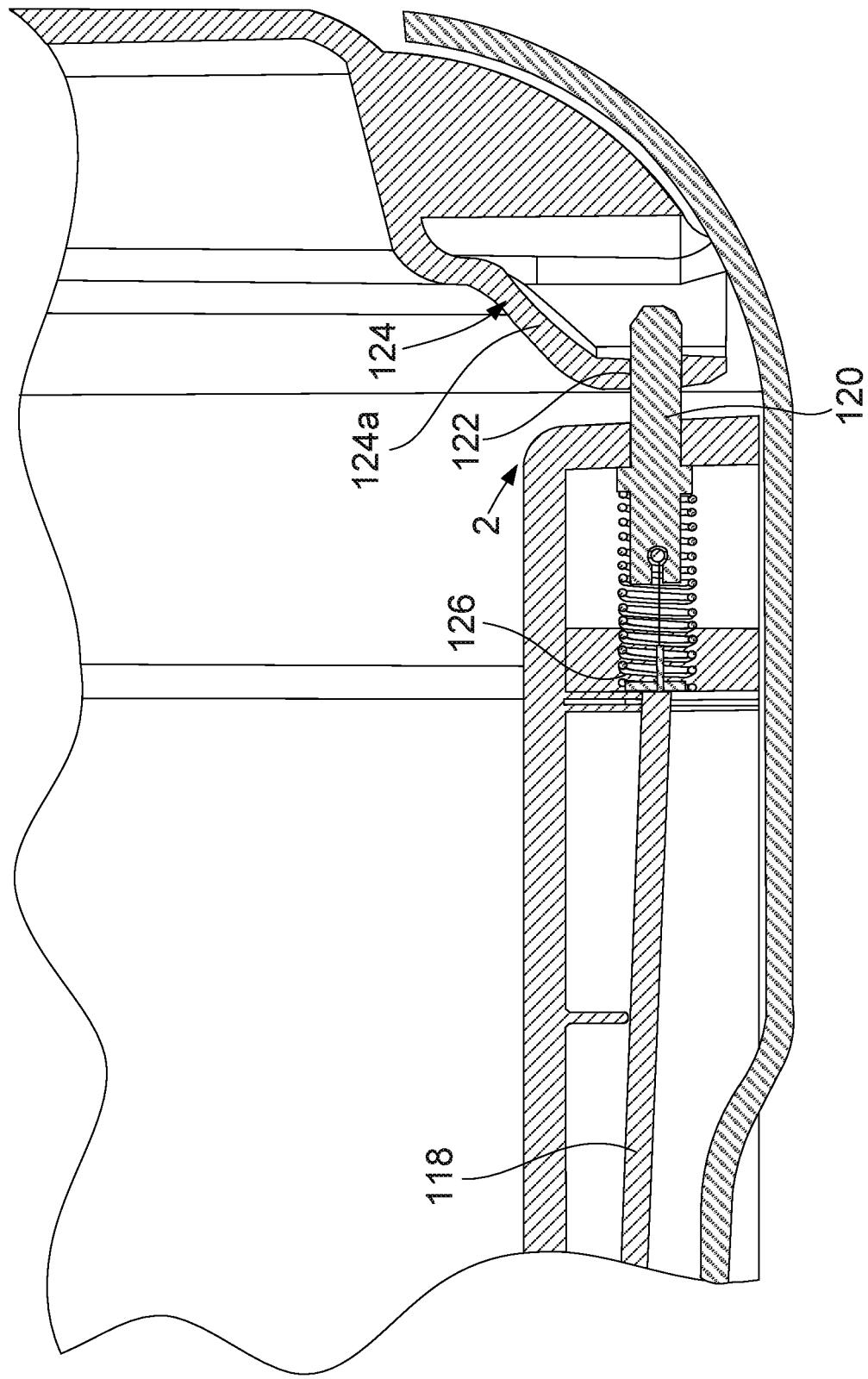
FIG. 14 is an enlarged perspective view of one of the latching assemblies used to hold the front divider panel in its stowed (i.e., lowered) orientation.

The construction of the front divider panel 102 is shown in greater detail in FIG. 13. The front divider panel 102 is shaped to clear the wheel well arches in the bed 12 as it is moved from its stowed to its operative position. FIG. 13 shows the front divider panel 102 in its stowed position. A paddle handle 116 is pivotally mounted within a recess 118. With additional reference to FIG. 14, when the paddle handle 116 is pulled pivotally outwardly using one or more fingers, it pulls on a cable 118. At its opposite ends the cable 118 is coupled to latching pins 120 via a spring 126. The spring 126 helps to provide tension to hold the cable 118 taut. Without limitation, in this example the paddle handle 116, the cable 118, the latching pins 120 and the springs 126 cooperatively form a first latching mechanism.

One of the latching pins 120 is visible in FIG. 13. Each latching pin 120 projects into an associated hole 122 in a lower formed recess 124 in an inner lower portion of the bed 12 sidewall. In this regard it will be appreciated that the bed 12 sidewalls and bed floor are formed with high strength plastic walls which are fixedly secured in place within the bed. Recess 124, in this example, is integrally formed in the bed 12 sidewall. Alternatively, suitably strong brackets (e.g., metal) may be fixedly secured to the bed sidewalls at the appropriate locations to engage the latching pins 120. As noted above, the spring 126 may be included between each latching pin 120 and each the end of the cable 118 to take up slack in the cable 118 and to maintain it taut, and to keep the latching pins 120 each biased in a normally outwardly projecting orientation. Thus, when the user pulls on the paddle handle 116, this causes the cable 118 to be effectively "shortened", thus retracting the latching pins 120 and allowing the front divider panel 102 to be pivoted about edge 102a into an upright position as shown in FIG. 11. When lowering the front divider panel 102, a tapered surface 124a of each formed lower recess 124 urges the pair of latching pins 120 inwardly, simultaneously, against the biasing force of the springs 126, in a camming-like action. As the front divider panel 102 reaches its fully lowered position, the latching pins 120 snap into the holes 122 in each formed lower recess 124, and then serve to retain the front divider panel in its stowed orientation.

Figure 15:
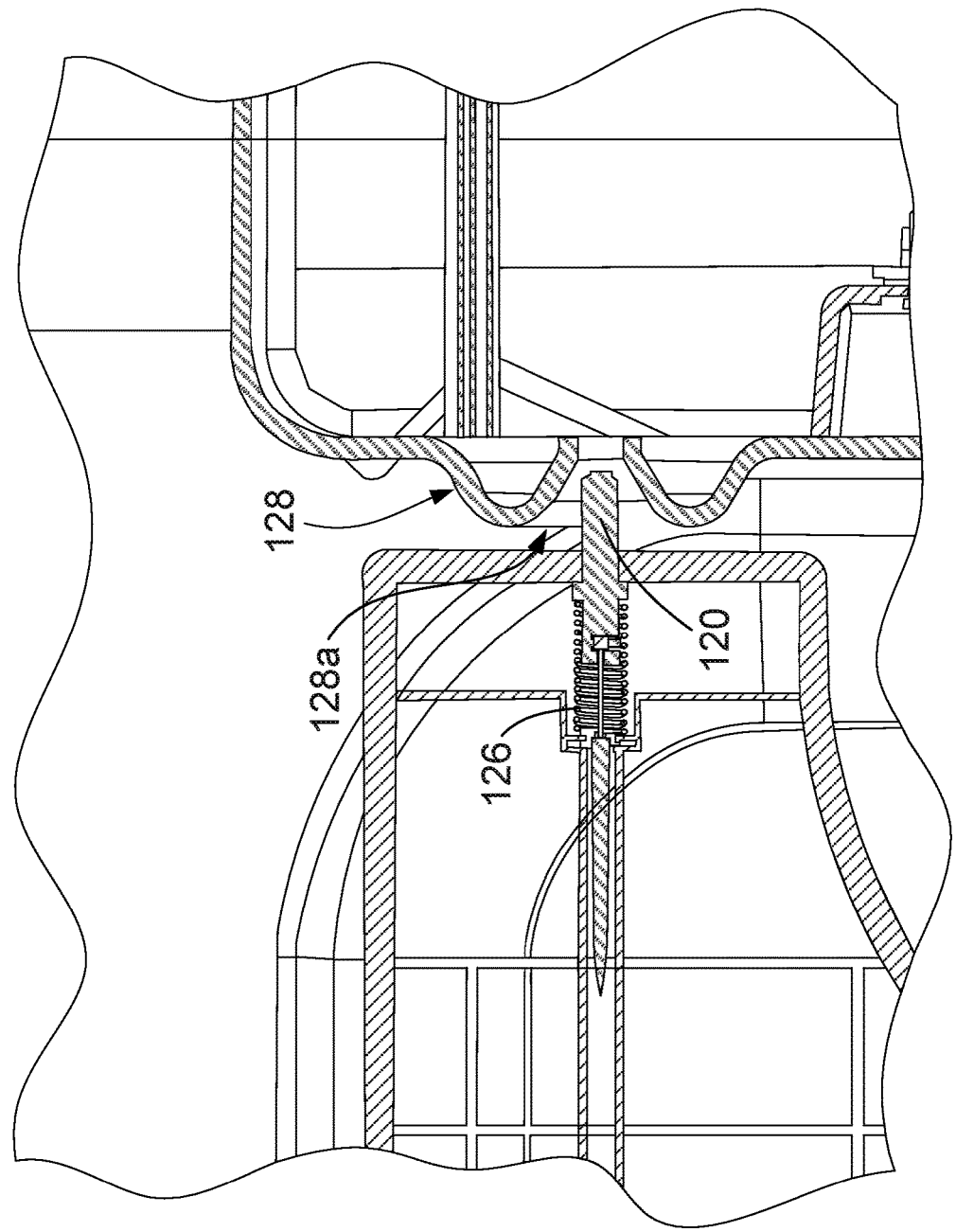
FIG. 15 is a simplified perspective view of one of the latching assemblies in the front divider panel engaged within a formed recess in the bed sidewall to hold the front divider panel in its operative (i.e., upright) orientation.

Referring to FIG. 15, when the front divider panel 102 is raised into its operative position, the latching pins 120 will each be disposed over an associated formed upper recess 128. Each formed upper recess 128 is formed on the inside of the bed 12 sidewall and includes an opening 128a. When the user releases the paddle handle 116 the springs 126 simultaneously bias the latching pins 120 into the openings 128 to latch the front divider wall 102 in the operative (i.e., upright) position. Again, the formed upper recesses 128 could be replaced by fixedly installed bracket assemblies (e.g., metal bracket assemblies).

Figure 16:
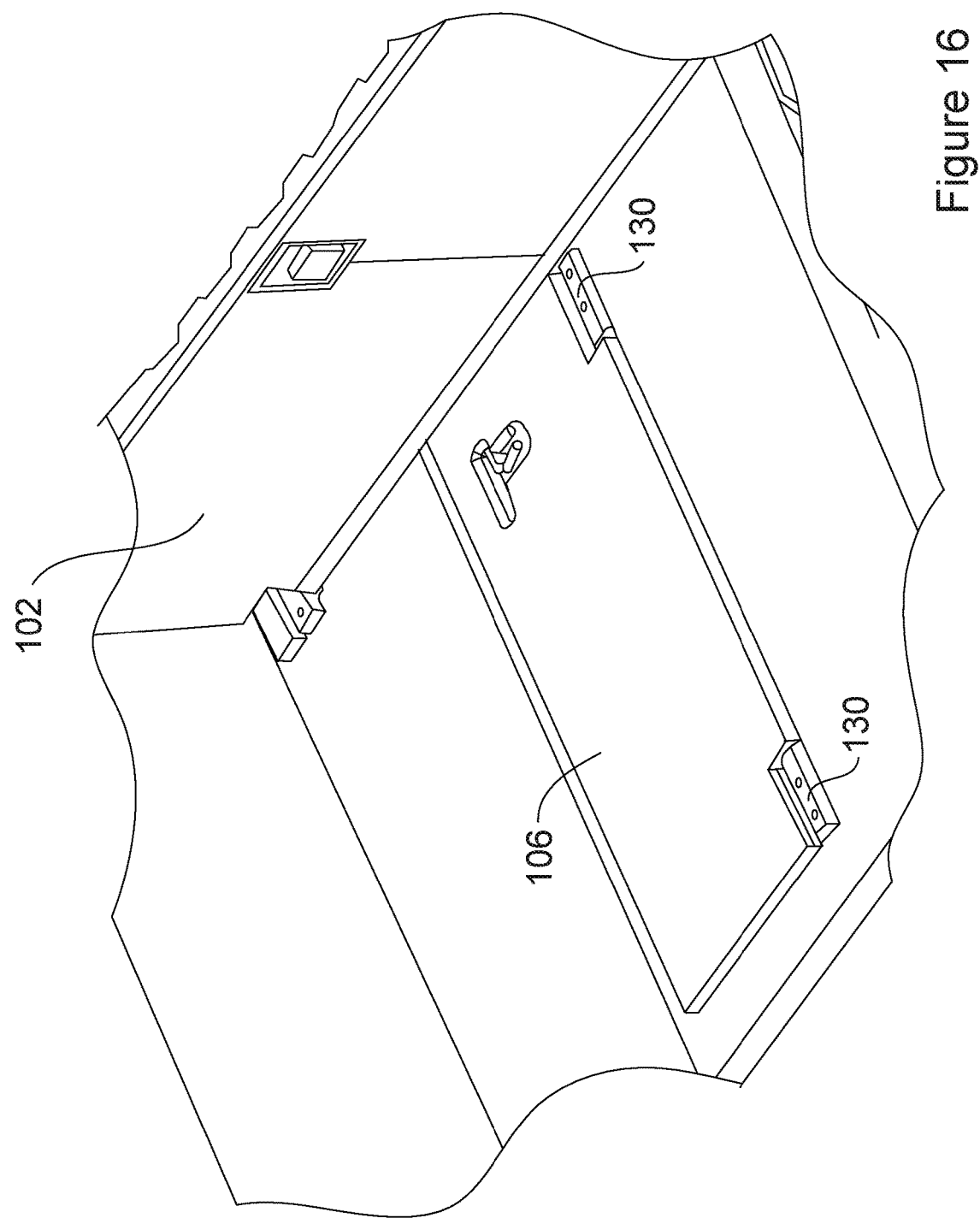
FIG. 16 is a perspective view of the front divider panel in its operative (i.e., upright) orientation with the center panel still in its stowed (i.e., lowered) orientation.
Figure 17:
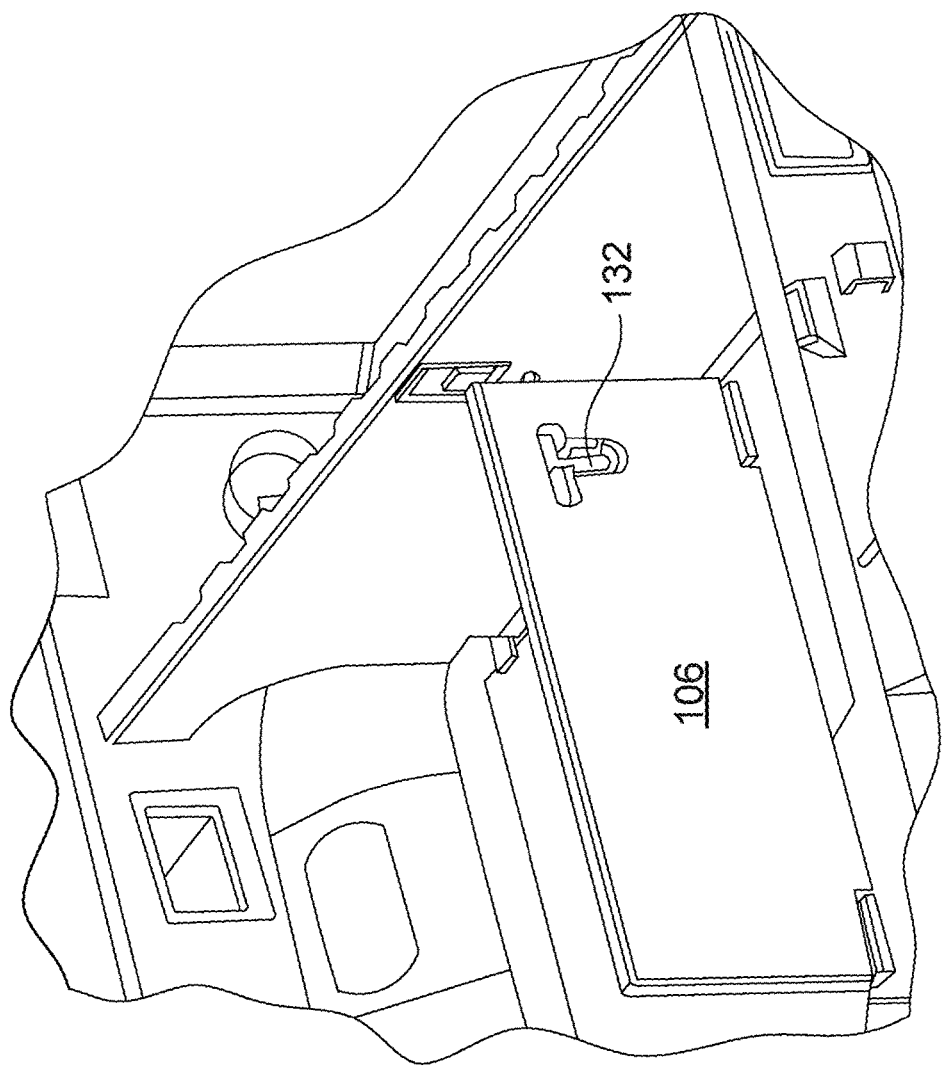
FIG. 17 is a perspective view of the center divider panel in its operative (i.e., upright) orientation secured to the front divider panel.
Figure 18:
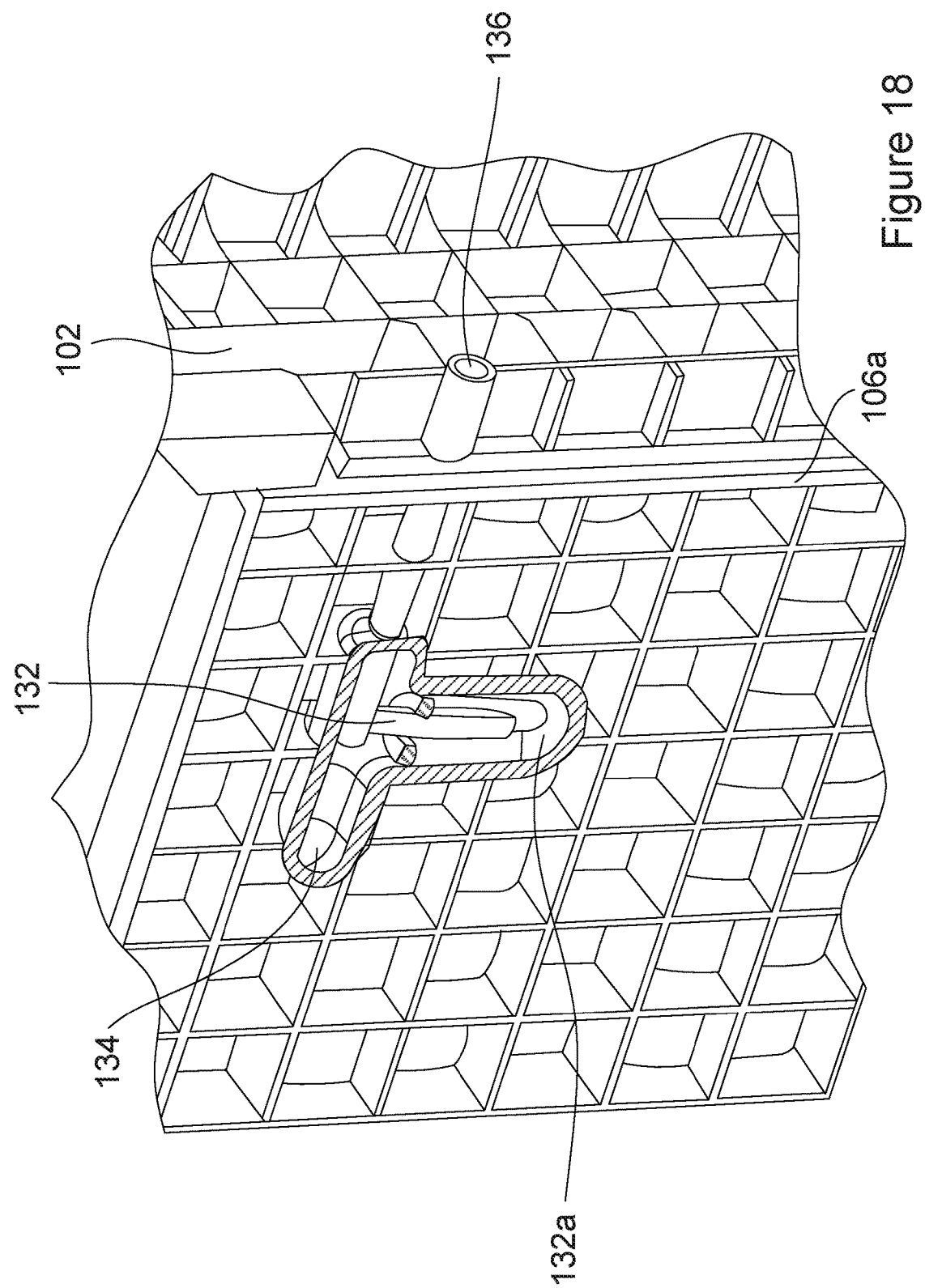
FIG. 18 is an enlarged perspective view of the locking assembly of the center divider panel engaging the front divider panel.

Referring to FIGS. 16-18, once the front divider panel 102 is latched in its upright position, the center divider panel 106 can be raised from its stowed position (FIG. 16) to its operative position. The center divider panel 106 is pivotally secured to the bed 12 floor by a pair of hinges 130. It also includes a deadbolt style locking element 132 which is pivotally secured in a recess 134 (FIG. 18) of the center divider panel 106, and thus rests below a surface of the center divider panel 106 when the panel 106 is lying flat in its stowed position on the bed 12 floor. The locking element 132 is positioned to engage a hole 136 in the front divider panel 102 when the user lifts a handle portion 132a of the locking element 132 out from the recess 134 and pushes it outwardly towards a side edge of the center divider panel 106. Once the locking element 132 is engaged in the hole 136, the center divider panel 106 is held securely in an operative (i.e., upright) position. Alternatively, the locking element 132 could be secured to a bracket assembly having a hole, where the bracket assembly is itself secured fixedly to the divider panel 102.

Figure 19:
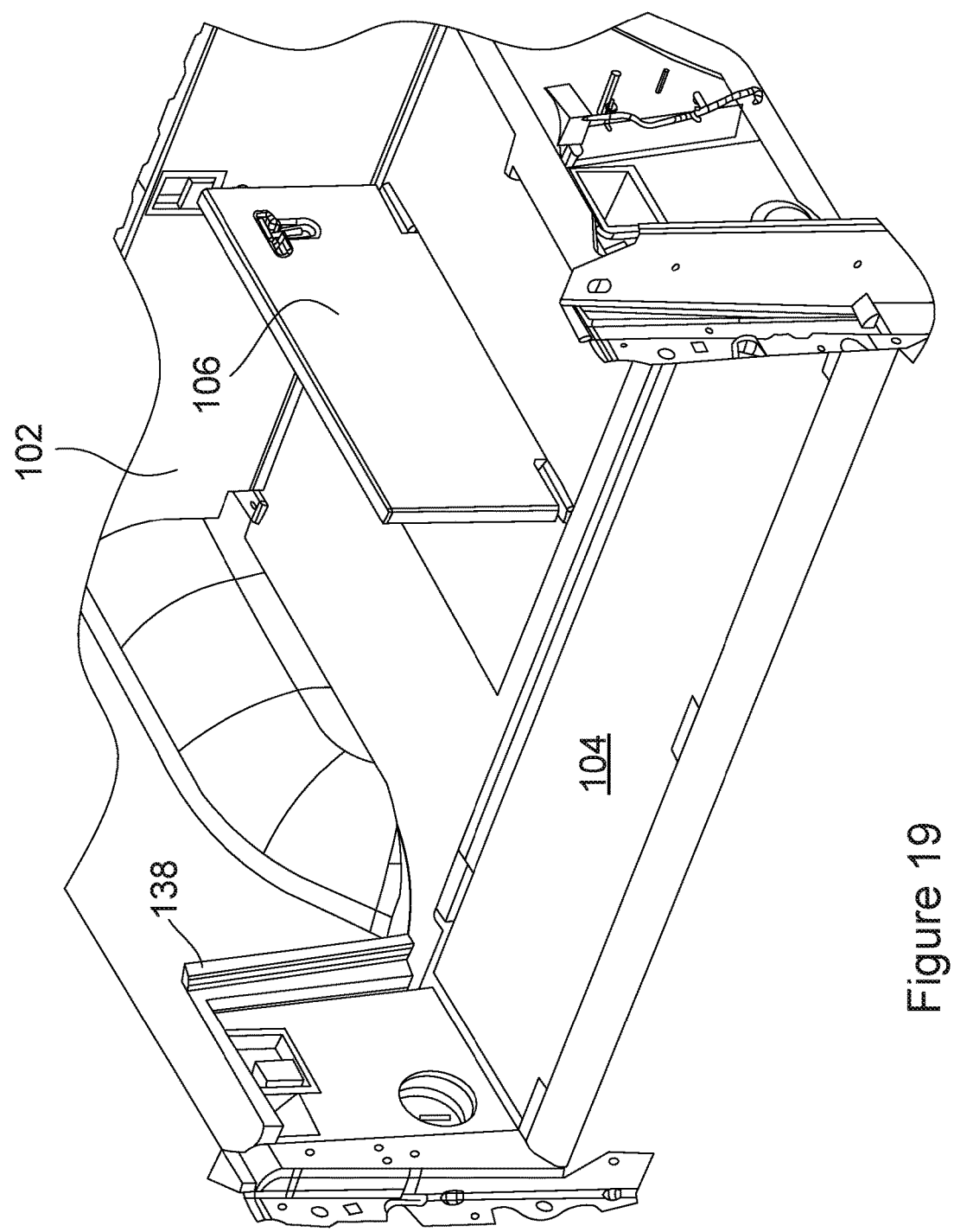
FIG. 19 is a perspective view of the bed of the vehicle showing the center divider panel raised into its operative (i.e., upright) position.
Figure 20:
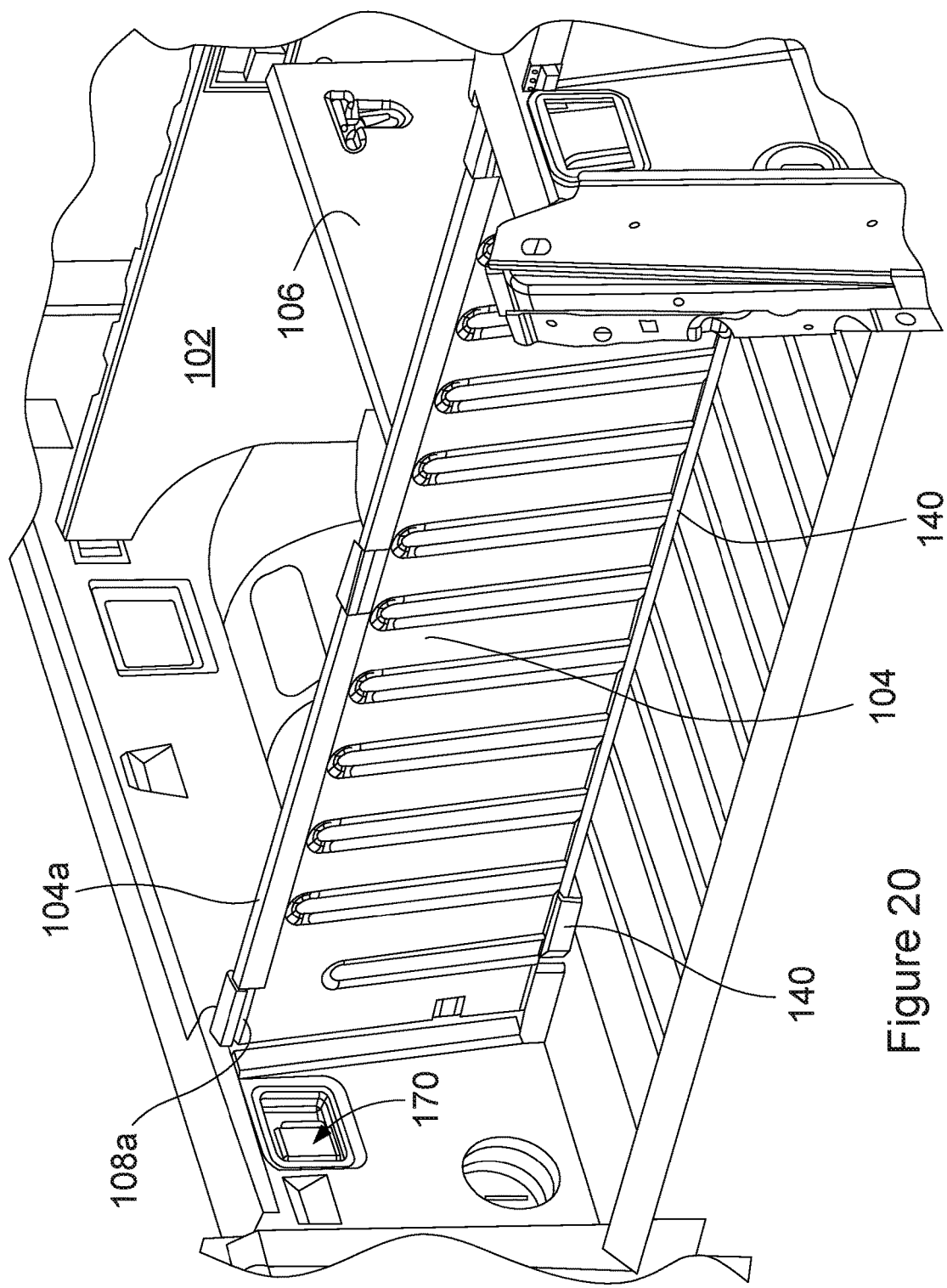
FIG. 20 is a perspective view of the rear divider panel being held in its operative (i.e., upright) position in the bed.
Figure 21:
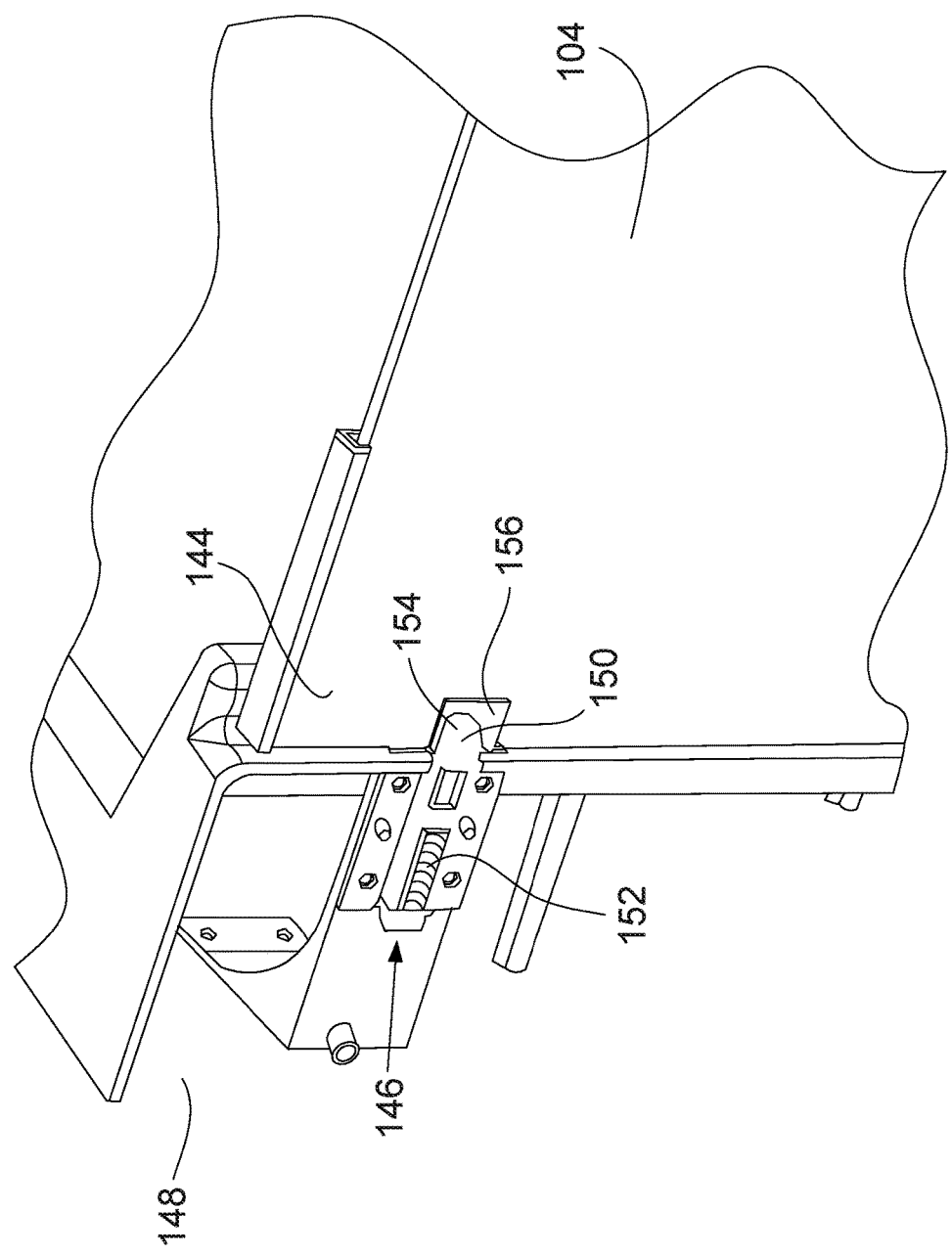
FIG. 21 is a simplified perspective illustration of one of the slam latching assemblies used to hold the rear divider panel in its operative (i.e., upright) orientation.

Referring to FIGS. 19-21, once the center divider panel 106 is positioned in its operative position, the rear divider panel 104 can be moved into its operative position. This is accomplished by lifting the rear divider panel 104 into the position shown in FIG. 20. It will be noted in FIG. 19, however, that an inside wall of the bed 12 includes a formed shoulder portion 138 which acts as a wall surface against which an outer edge of the rear divider panel 102 can abut to limit the pivoting motion of the panel 102. In FIG. 20, it can be seen that the rear divider panel 104 is hingedly moveable relative to a floor of the bed 12 via a hinge rod 140 and a pair of fixedly mounted blocks 142 that receive the opposite ends of the hinge rod.

FIG. 21 illustrates how an upper corner 144 of the rear divider panel 104 is secured to the bed 12 sidewall. This is accomplished using a slam latching assembly 146 which is fixedly mounted within a well 148 in the bed 12 sidewall. The slam latching assembly 146 includes a latch element 150 biased by a spring 152. The latch element 150 has a tapered surface 154 which is depressed as the upper corner 144 of the rear divider panel 104 moves over it while being moved into the fully operative (i.e., upright) position. An identical slam latching assembly 146 is disposed in the bed 12 sidewall at the opposite side of the bed 12. The slam latching assemblies 146 may be cooperatively viewed as a second latching mechanism.

As the rear divider panel 104 reaches its fully upright position while being moved from its stowed position, the latch elements 150 in the slam latching assemblies 146 simultaneously snap into recesses 156 in the side edges of the rear divider panel 104 facing the latch elements 150. At this point the rear divider panel 104 is held securely in its operative (i.e., upright) position.

Once the rear divider panel 104 is in its operative position, the auxiliary panel 114 can be lifted into its operative position. It will be understood that the auxiliary panel 114 is hinged along edge 114a to an upper edge 104a of the rear divider panel via a conventional elongated pivot rod, or by any other conventional hinge assembly.

Figure 22:
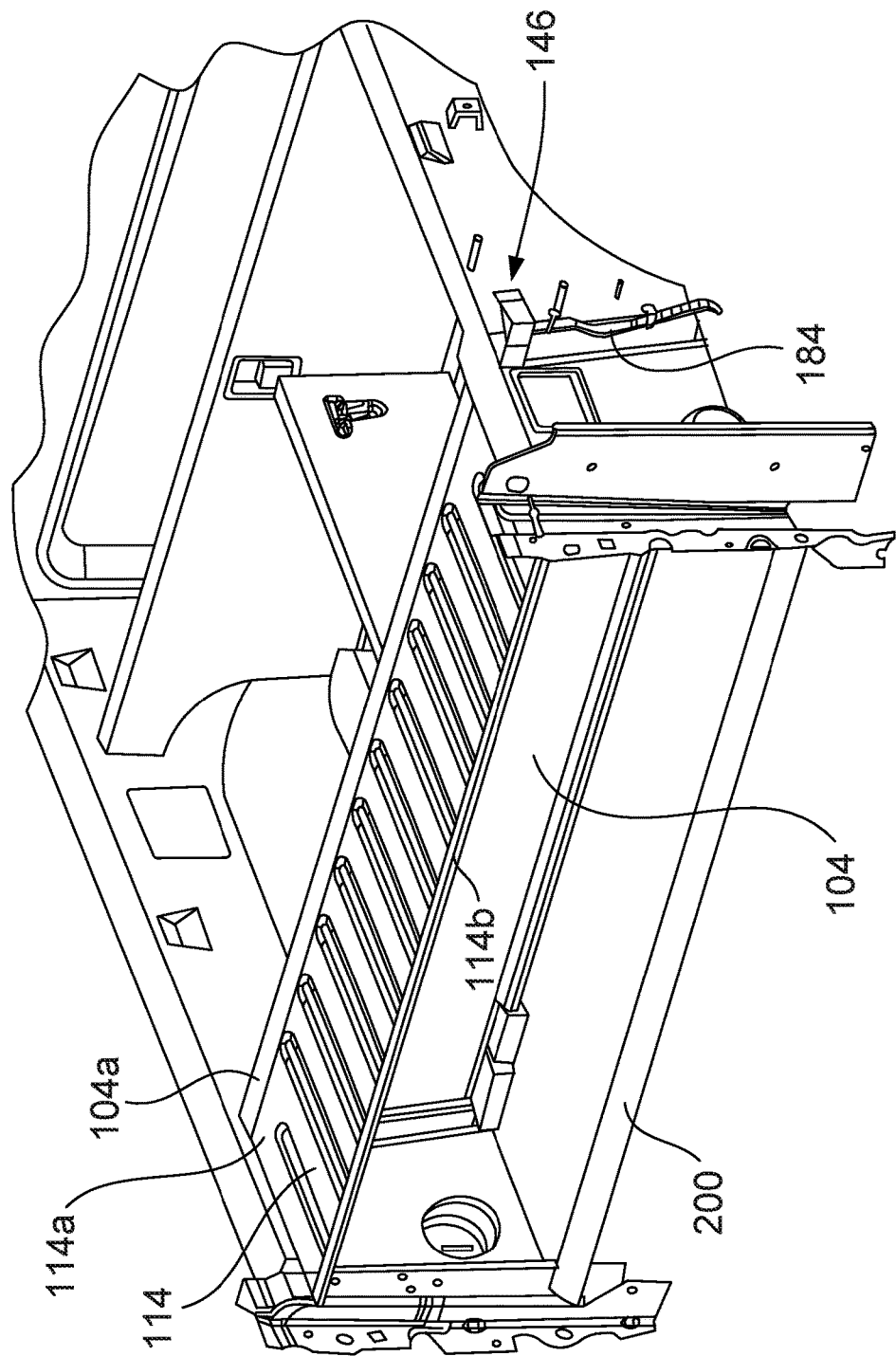
FIG. 22 is a perspective view of the bed of the vehicle (tailgate omitted for clarity) showing the auxiliary panel in its operative (i.e., horizontally extending) orientation.
Figure 23:
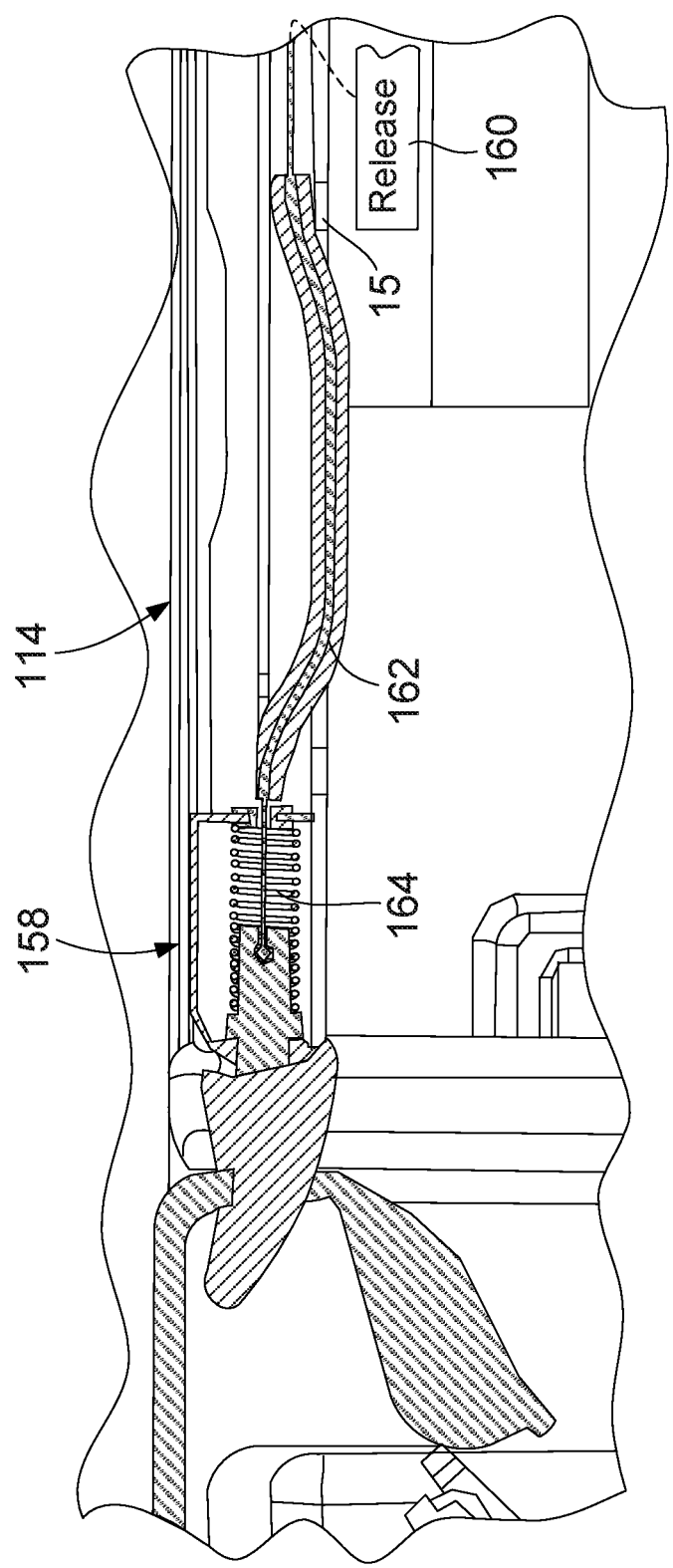
FIG. 23 is a simplified cross sectional view showing the latching system which latches the auxiliary panel into its raised (i.e. horizontally extending) operative position.

Referring to FIGS. 22 and 23, lifting of the auxiliary panel 114 is performed by grasping edge 114b and lifting upwardly. Edge 114b of the auxiliary panel 114 includes a pair of built-in rear latching assemblies 158 (FIG. 23) at opposite side edges of the auxiliary panel 114. The rear latching assemblies 158 are housed within a hollow area in the auxiliary panel 114 adjacent edge 114b. A manually graspable release element 160 is positioned on an inner surface 114c of the auxiliary panel 114 and coupled to a pair of cables 162 which extend to a respective latching pin 159 associated with each rear latching assembly 158. A spring 164 may be used to couple an end of each cable 162 to its associated rear locking assembly 158. The springs 164 help to maintain the cables 162 taut. It will be appreciated that only one rear latching assembly 158, one cable 162 and one spring 164 are shown in FIG. 23, but that the exact configuration is present at the opposite side edge of the auxiliary panel 114. The rear latching assemblies 158, the release element 160, the pair of cables 162 and springs 164 may be cooperatively viewed as a third latching mechanism. The release element 160 allows easy access by a user to release the pair of rear latching assemblies 158 when the auxiliary panel 114 needs to be lowered into a stowed position. When the release element 160 is pulled outwardly, this causes the latching pins 159 to be simultaneously withdrawn by the cables 162 from respective openings 161a in formed projecting portions 161 of the bed 12 sidewalls, thus allowing the auxiliary panel 114 to be unlatched from the bed 12 sidewalls. When the tailgate 24 of the vehicle is in its raised position, the rear divider panel 104, the auxiliary panel 114 and the tailgate cooperate to form the compartment 112. When the tailgate 24 is in its closed (i.e., raised) position and locked, the compartment 112 cannot be accessed from outside the vehicle, and thus forms a relatively secure compartment for temporarily storing items such as tools or other cargo items.

Figure 24:
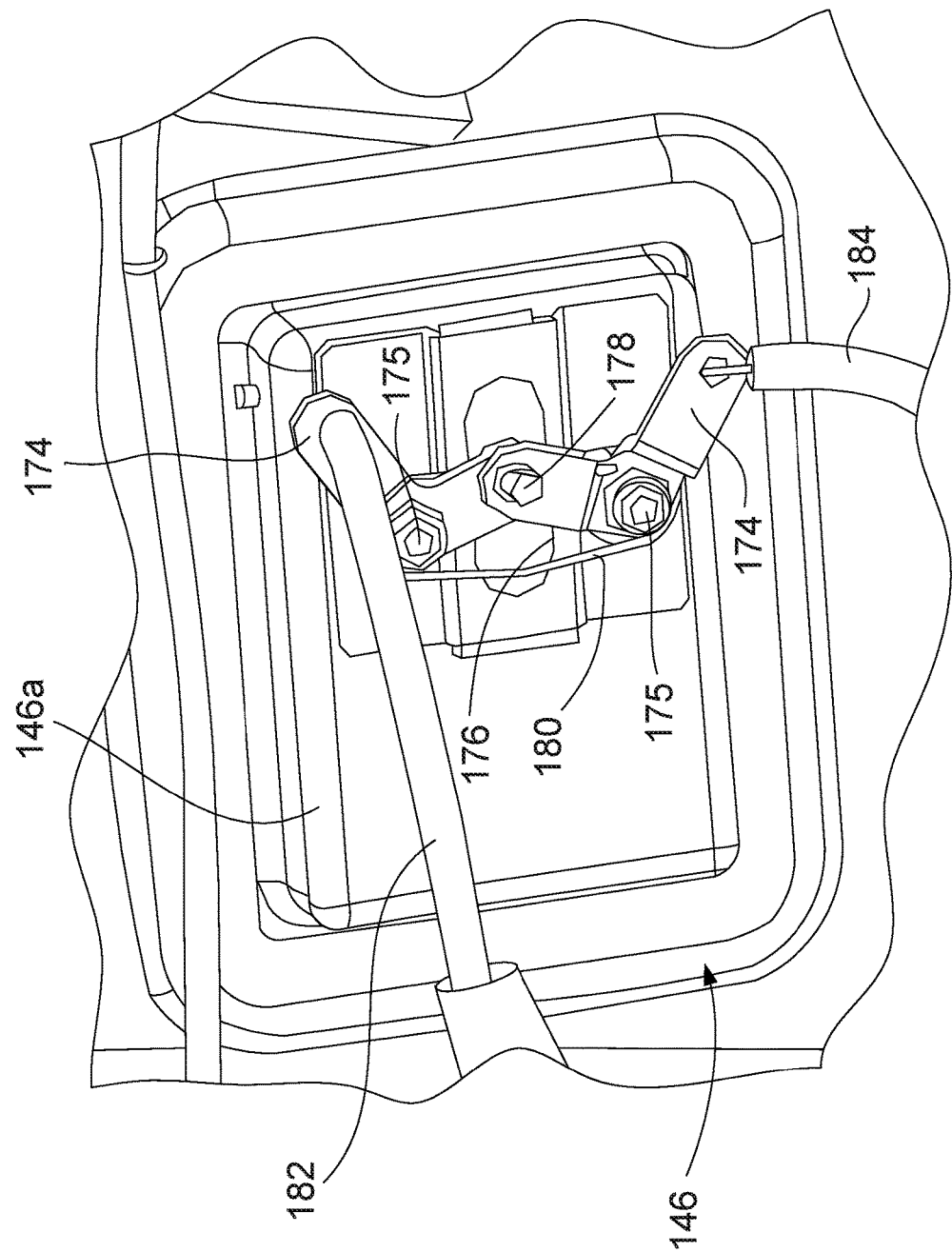
FIG. 24 is a perspective view of a rear side of one of the slam latching assemblies which are used to hold the rear divider panel latched in its operative (i.e., upright) orientation.

Referring briefly to FIGS. 20 and 24, a latching release mechanism 170 is shown which is used to release slam latching assemblies 146 to allow the rear divider panel 106 to be lowered from an operative position to a stowed position. The latching release mechanism 170 is an assembly which is commercially available from Sierra Pacific Engineer and Products of Long Beach, Calif., as stock item 471, under the name "2-PT Large Paddle Handle, Locking, Electro Galvanized, No Holes". Obviously, any other suitable latching assembly could be used, and the above specific latch mechanism is merely meant to illustrate one suitable latching mechanism that may be implemented. The latching release mechanism 170 component includes a toggle lever 172 which, when pulled pivotally outwardly simultaneously causes rotation of a pair of pivotally mounted actuating elements 174, which are pivotally mounted via threaded fastener assemblies 175 to a mounting plate 146a of the slam latching assembly 146. As the toggle lever 172 is pulled to the open position, the actuating elements 174 simultaneously rotate about the fastener assemblies 175 as a pin 178, attached to each end of the actuating elements 174 and operatively coupled to the toggle lever 172, is caused to translate within a slot 176 (i.e., to the left in the illustration of FIG. 24). Spring 180 is coupled to both of the actuating elements 174 in a manner which tends to bias the actuating elements 174 into the position shown in FIG. 24, which also biases the toggle lever 172 into its closed position as shown in FIG. 20. As the toggle lever 174 is pulled outwardly into its open position, this shortens the internal, slidable cable elements of cables 182 and 184. Cables 182 and 184 are coupled to the latch elements (i.e., pin-like elements) 150 of the slam latch assemblies 146, and thus the effective shortening of the cables 182 and 184 causes the latch elements 150 of the two slam latch assemblies 146 to be simultaneously withdrawn from the recesses 156 in opposite side edges of the rear divider panel 104. Cable 184 extends beneath the floor of the bed 12 and up behind the sidewall to the other slam latch assembly 146 on the opposite bed sidewall.

Collapsing the various panels of the system 100 into their stowed positions is performed in the order opposite to that described above. That is, the auxiliary panel 114 is first unlatched and lowered. The rear divider panel 104 is then released from the slam latch assemblies 146 and lowered to lay flat on the bed 12 floor. The center divider panel 106 is then unlatched from the front divider panel 102 by first releasing the locking element 132 from the front divider panel 102, and then lowering the center divider panel flat onto the bed 12 floor. The front divider panel 102 is then unlatched from the upper formed recesses 128 in the bed 12 sidewalls using the paddle handle 116 and lowered into a position generally flush on the bed 12 floor until the latching pins 120 engage with the lower formed recesses 124. In this regard it will be appreciated that the bed 12 floor may be formed with recesses that allow the panels 102, 104, 106 and 114 to reset therein when all of the panels 102, 104, 106, and 114 are in their stowed positions, and thus allow the stowed panels to form a generally planar surface. A generally planar surface for the floor of bed 12 eases the movement of cargo items within the bed when the system 100 is not in use.

It will also be noted that the rear divider panel 104 is able to be lifted up and latched in its operative (i.e., upright) position without the center panel 106 being raised into its operative position. Still further, the rear divider panel 104 is able to be used in its operative position without either of the front or center divider panels 102 and 106, respectively, being raised into their operative positions, as well as without the auxiliary panel 114 being raised into its operative (i.e., horizontally extending) position. These features provide a significant degree of added flexibility in using the system 100 to configure the bed 12 to handle and restrain variously sized cargo items against movement within the bed 12.

Figure 25:
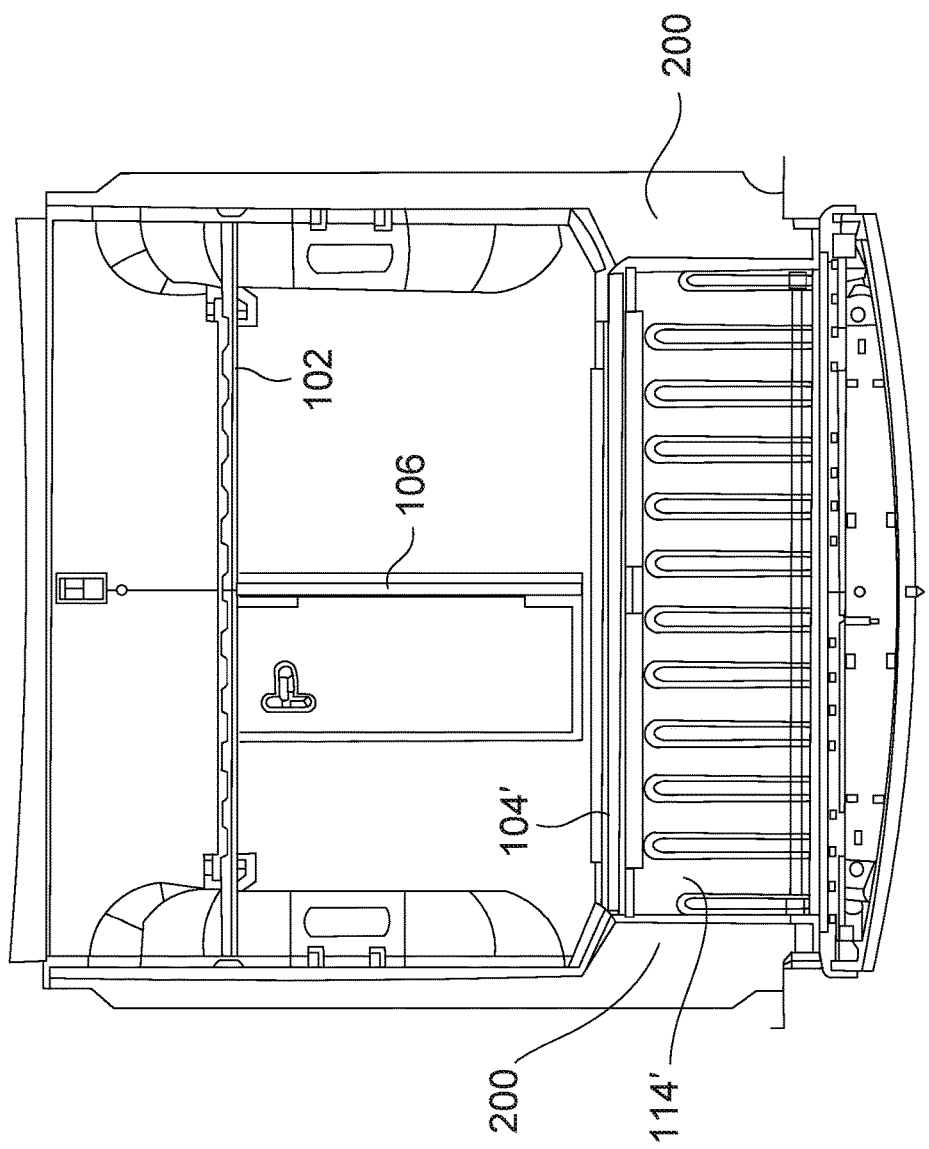
FIG. 25 is a simplified plan view showing an alternative configuration of the rear divider panel and the auxiliary panel.

With brief reference to FIG. 25, an alternative configuration for the rear divider panel 104' and the auxiliary panel 114' is shown. This embodiment involves extending inwardly portions of the high strength sidewall panels 200 such that the rear divider panel 104' and the auxiliary panel 114' are made narrower in width-wise length. In the event the system 100 is being used with an elevated load bar system while is positioned over the bed 24, the narrowed width of the panels 104' and 114' ensures that the auxiliary panel 114' will be able to be articulated even if the elevated load bar is positioned at a point along the bed 24 where it fully or partially resides over the auxiliary panel 114'. Optionally, weather sealing materials could be incorporated around the perimeter of the auxiliary panel 114', and possibly along the upper edge of the rear divider panel 104' and/or along the upper edge of the tailgate, to produce a water resistant compartment when the auxiliary panel 114' is in its operative position engaged with the upper edge of the tailgate.

Figure 26A:
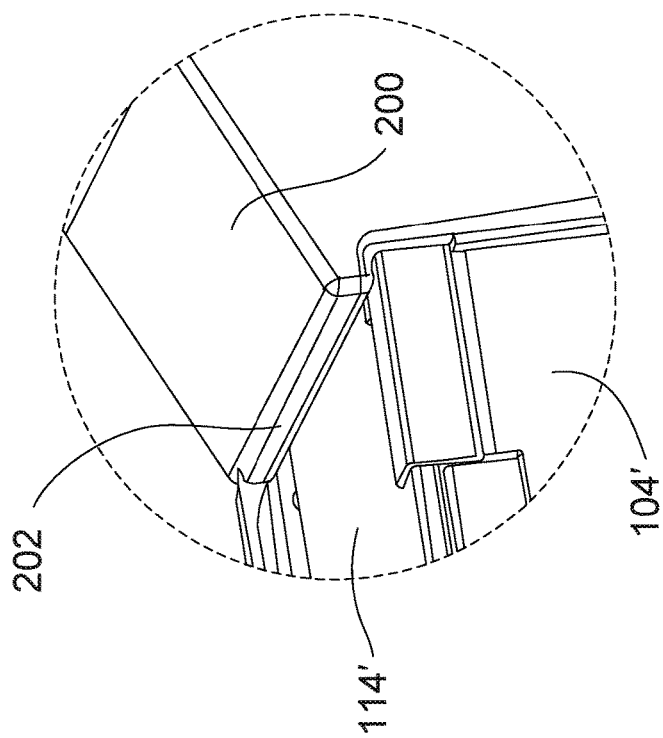
FIG. 26 is a perspective view of a portion of the system illustrating how the high strength sidewall panels may be used to form a stop against which the auxiliary panel abuts when in its operative position.
Figure 26:
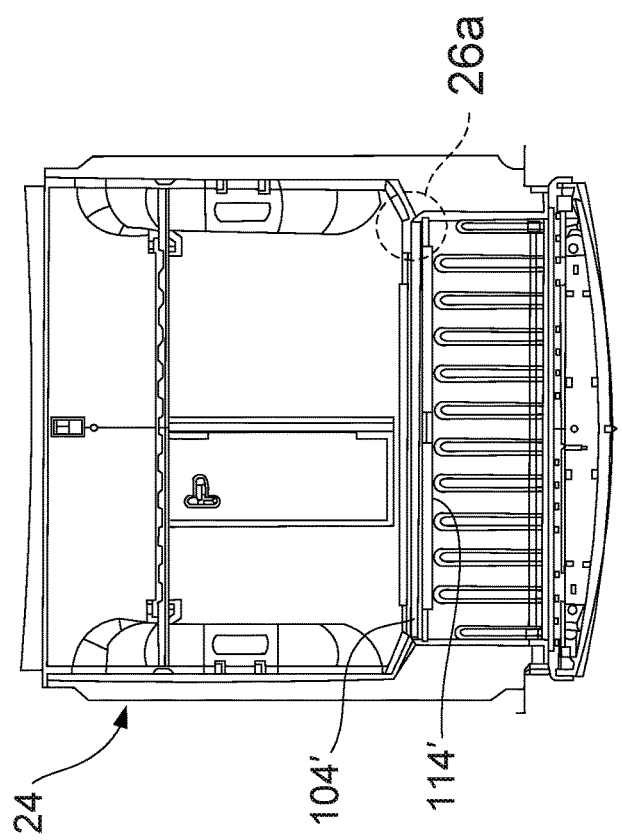

FIG. 26 further illustrates how the high strength sidewall panels 200 could be used to help form a "stop" against which the auxiliary panel 114' abuts when in its operative position. The "stop" is formed by a ledge 202 against when opposing edge surfaces of the auxiliary panel 114' may abut when the auxiliary panel is lifted into its operative position. The ledge 202 may include weather sealing material (not visible along its lower surface) which helps to seal the compartment within the auxiliary panel 114' when the auxiliary panel is in its raised, operative position.

With brief reference to FIG. 22, it will also be appreciated that a ramp 204 could be utilized at rear most edge of the bed 24 floor. The ramp essentially forms a surface that assists in sliding cargo objects into the bed 24 due to the slight elevated nature of the bed 24 floor. As described above, the floor of the bed 24, which may be a high strength plastic material, may be slightly elevated due to it having a sufficient thickness to accommodate recesses for one or more of the divider panels 102, 104, 106 and 114. The recesses enable the panels 102, 104, 106 and 114 to be stowed while still enabling a generally planar upper surface to be formed over which cargo items can be easily slid into and out from the bed 24. But this slightly increased thickness of the bed, without the ramp 24, would form a "step" over which cargo items would need to be slid. The ramp 24 thus forms a smooth transition from the inside surface of the tailgate to the upper surface of the bed 24 floor, which eases the sliding entry and removal of cargo items to/from the bed 24. The ramp 204 may also be made from a high strength plastic or possibly even from a metallic (e.g., aluminum) material.

The various embodiments of the systems 10 and 100 thus each provide a highly convenient means for forming a plurality of variously sized cargo restraining compartments or sections within the cargo area of a vehicle. When in their stowed orientations, the various panels of the system 10 or 100 lie essentially flat against a floor of the truck bed, or otherwise form a generally planar surface, and thus do not impede sliding articles into and out from the cargo area of the bed. The various panels can be quickly and easily articulated from their stowed orientations into their operative orientations without the need for any external tools. When the various panels of the system 10 or 100 are in their stowed orientation, the cargo area is free to be used as a single large open area, and the system 10 consumes very little space within the cargo area. When the various panels of the system 10 or 100 are moved into their operative positions, various forms of cargo items can be restrained against movement within the cargo area.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A cargo management system for use with a motor vehicle cargo area with a floor, the system including:
    a front divider panel configured to lay flat against the floor of the cargo area when in a stowed position, and pivotally moveably into an upright, operative position;
    a first recess formed in a lower area of a sidewall of the cargo area;
    a second recess formed in an upper area of the sidewall of the cargo area;
    a first latching mechanism, carried on the front divider panel, for latching the front divider panel to the first recess in the lower area of the sidewall of the cargo area, when the front divider panel is in the stowed position, and engaging with the second recess to latch the front divider panel in an upright position extending perpendicularly from the floor when the front divider panel is moved into the upright, operative position;
    a center divider panel pivotally supported so as to be moveable from a stowed position to an operative position;
    a rear divider panel pivotally supported relative to the floor of the cargo area and moveable from a stowed position resting generally flat on the floor of the cargo area to an upright, operative position; and
    a second latching mechanism for latching the rear divider panel in the upright, operative position.

2. The system of claim 1, wherein the cargo area comprises a bed of a pickup truck.

3. The system of claim 1, further comprising a locking system integrated into the center divider panel for releasably coupling the center divider panel to the front divider panel.

4. The system of claim 1, wherein the front divider panel is pivotally coupled to the floor of the cargo area.

5. The system of claim 1, further comprising an auxiliary panel operably associated with the rear divider panel for creating a closed compartment in cooperation with a door-like component of the cargo area.

6. The system of claim 5, wherein the auxiliary panel is pivotally attached to an upper edge of the rear divider panel.

7. The system of claim 1, wherein the second latching mechanism comprises:
- a latching release mechanism supported fixedly relative to one of the sidewalls, the latching release mechanism having a toggle lever;
- first and second latch elements disposed on the sidewalls of the cargo area;
- a first cable coupling the first latch element with the latching release mechanism;
- a second cable coupling the second latch element with the latching release mechanism; and
- wherein manually pivoting the toggle lever from a locked to an unlocked position causes simultaneous movement of the first and second latch elements away from one another and out of engagement with portions of the rear divider panel, to enable the rear divider panel to be lowered from the upright, operative position to the stowed position.

8. The system of claim 7, wherein the second cable is routed underneath the floor of the cargo area to the second latch element.

9. The system of claim 6, further comprising a third latching mechanism associated with the auxiliary panel for releasably securing the auxiliary panel to at least one of the sidewalls of the cargo area so as to be supported in a generally horizontally extending configuration.

10. The system of claim 1, further comprising:
- an additional first recess formed along a lower area of an opposing sidewall of the vehicle cargo area which faces the sidewall;
- an additional second recess formed along an upper area of the opposing sidewall;
- wherein the first latching mechanism comprises:
- first and second latching pins positioned adjacent opposing sides of the front divider panel;
- a pivotally mounted, manually engageable paddle handle disposed on the front divider panel;
- a cable coupling the paddle handle with the first and second latching pins;
- the first and second latching pins engaging the formed recesses second recess and the additional second recess when the front divider panel is in the upright, operative position, and engaging the first recess and the additional first recess when the front divider panel is positioned in the stowed position; and
- wherein pivotal movement of the paddle handle from a closed position to an open position operates to cause the cable to simultaneously pull on both of the first and second latching pins to cause disengagement of the first and second latching pins with either the first recess and the first additional recess, or the second recess and the second additional recess, to enable the front divider panel to be secured against movement in both the upright, operative position and in the stowed position.

11. A cargo management system for use with a motor vehicle cargo area with a floor, the system including:
- a front divider panel configured to lay flat against the floor of the cargo area when in a stowed position, and pivotally moveably into an upright, operative position;
- a first latching mechanism configured to releasably latch opposing side portions of the front divider panel to opposing sidewalls of the cargo area, to thus maintain the front divider panel in the upright, operative position;
- a center divider panel pivotally supported so as to be moveable from a stowed position to an upright, operative position;
- a rear divider panel pivotally supported relative to the floor of the cargo area and moveable from a stowed position resting generally flat on the floor of the cargo area to an upright, operative position;
- an auxiliary panel hingedly coupled to the rear divider panel;
- a second latching mechanism disposed in the sidewalls and operable to engage with the opposing sides of the rear divider panel to hold the rear divider panel in the upright, operative position; and
- a third latching mechanism configured to releasably latch the auxiliary panel in a horizontally extending orientation extending parallel to the floor of the cargo area.

12. The system of claim 11, wherein the auxiliary panel cooperates with a cargo door-like component to form a closed compartment when the cargo door-like component is closed and the auxiliary panel is latched in the horizontally extending orientation.

13. The system of claim 12, wherein the cargo door-like component comprises a tailgate.

14. The system of claim 11, wherein the cargo area comprises a bed of a pickup truck.

15. The system of claim 11, wherein the center divider panel is pivotally secured to the floor of the cargo area.

16. The system of claim 11, wherein the center divider panel comprises a locking system having a user graspable handle that is linearly movable to engage with a hole formed in the front divider panel to lock the center divider panel in the upright, operative position.

17. The system of claim 11, wherein the second latching mechanism comprises:
- first and second latch elements disposed on the sidewalls;
- a latching release mechanism disposed in one of the sidewalls, the latching release mechanism including:
- a pivotally disposed and manually engageable toggle lever;
- a first cable coupled to the latching release mechanism and to the first latch element;
- a second cable coupled to the latching release mechanism and to the second latch element; and
- wherein a pivoting movement of the toggle lever causes a simultaneous unlatching of the first and second latch elements from the rear divider panel.

18. The system of claim 11, wherein the sidewalls include a wall portion for limiting pivoting movement of the rear divider panel and assisting in maintaining the rear divider panel in the upright, operative position.

19. The system of claim 11, wherein the center divider panel includes a locking system supported in a surface of the center divider panel, and having a portion that may be grasped by an individual and rotated outwardly away from the surface of the center divider panel, and wherein the locking system is further moveable linearly such that a bolt thereof is able to engage an opening in the front divider panel to thus hold the center divider panel in the upright, operative position.

20. A cargo management system for use with a motor vehicle cargo area with a floor, the system including:
- a front divider panel configured to span fully between a pair of sidewalls of the cargo area and to lay flat against the floor of the cargo area when in a stowed position, and further being pivotally moveably into an upright, operative position;
- a first latching mechanism associated with the front divider panel;
- a pair of first formed recesses formed in the pair of sidewalls of the vehicle cargo area and configured to cooperate with the first latching mechanism to hold the front divider panel the upright, operative position;
a center divider panel pivotally supported from the floor so as to be moveable from a stowed position to an upright, operative position extending parallel to the sidewalls;
a locking system carried on the center divider panel, the locking system operable to engage with an opening in the front divider panel to hold the center divider panel in the upright, operative position;
a rear divider panel configured to fully span between the sidewalls and being pivotally supported relative to the floor of the cargo area, and moveable from a stowed position resting generally flat on the floor of the cargo area to an upright, operative position;
a second latching mechanism including a pair of latch assemblies disposed on the sidewalls and operable to engage with the rear divider panel to hold the rear divider in the upright, operative position;
an auxiliary panel hingedly coupled to the rear divider panel;
a third latching mechanism operably associated with the auxiliary panel; and
a pair of second formed recesses disposed on the sidewalls and operable to cooperate with the third latching mechanism to releasably latch the auxiliary panel in a horizontal orientation extending parallel to the floor.

* * * * *